(12) United States Patent
Guo et al.

(10) Patent No.: US 12,185,400 B2
(45) Date of Patent: Dec. 31, 2024

(54) USER PLANE INTEGRITY PROTECTION CONFIGURATION IN EN-DC

(71) Applicant: APPLE INC., Cupertino, CA (US)

(72) Inventors: Shu Guo, Beijing (CN); Dawei Zhang, Cupertino, CA (US); Fangli Xu, Beijing (CN); Haijing Hu, Cupertino, CA (US); Huarui Liang, Beijing (CN); Yuqin Chen, Beijing (CN)

(73) Assignee: APPLE INC., Cupertino, CA (US)

( * ) Notice: Subject to any disclaimer, the term of this patent is extended or adjusted under 35 U.S.C. 154(b) by 559 days.

(21) Appl. No.: 17/593,527

(22) PCT Filed: Oct. 29, 2020

(86) PCT No.: PCT/CN2020/124865
§ 371 (c)(1),
(2) Date: Sep. 20, 2021

(87) PCT Pub. No.: WO2022/087969
PCT Pub. Date: May 5, 2022

(65) Prior Publication Data
US 2022/0312520 A1  Sep. 29, 2022

(51) Int. Cl.
*H04W 76/15* (2018.01)
*H04W 12/033* (2021.01)
*H04W 12/106* (2021.01)

(52) U.S. Cl.
CPC ......... *H04W 76/15* (2018.02); *H04W 12/033* (2021.01); *H04W 12/106* (2021.01)

(58) Field of Classification Search
None
See application file for complete search history.

(56) References Cited

U.S. PATENT DOCUMENTS

| 2015/0327094 | A1 | 11/2015 | Lee et al. |
| 2017/0071023 | A1 | 3/2017 | Kunz et al. |
| 2019/0149997 | A1* | 5/2019 | Liao .................. H04W 76/15 |
| | | | 455/411 |

(Continued)

FOREIGN PATENT DOCUMENTS

WO  2019051373 A1  3/2019

OTHER PUBLICATIONS

CMCC, "Further Clarification on Dual Connectivity Terminology", R2-141106, 3GPP TSG-RAN WG2 Meeting #85bis, Valencia, Spain, Agenda Item 7.1.1, Mar. 31-Apr. 4, 2014, 2 pages.

(Continued)

*Primary Examiner* — Jamaal Henson
(74) *Attorney, Agent, or Firm* — Dorsey & Whitney LLP

(57) ABSTRACT

Systems and methods provide packet data convergence protocol (PDCP) user plane (UP) integrity protection (IP) for a user equipments (UE) and radio access network (RAN) nodes operating in Evolved Universal Terrestrial Radio Access-New Radio dual connectivity (EN-DC). In an attach procedure, a UE may indicate a UE security capability for support of relay node (RN) PDCP UP IP used in LTE. Based on the LIE security capability, a master e Node B (MeNB) security capability, and a secondary g Node B (SgNB) security capability, the MeNB may determine whether to use UP IP between the UE and the MeNB, the UE and the SgNB, and/or in a split bearer between the MeNB and the SgNB.

18 Claims, 16 Drawing Sheets

(56) References Cited

U.S. PATENT DOCUMENTS

| | | |
|---|---|---|
| 2019/0174576 A1 | 6/2019 | Palat et al. |
| 2019/0394651 A1 | 12/2019 | Wifvesson et al. |
| 2020/0015088 A1* | 1/2020 | Luo .................... H04W 12/041 |
| 2020/0336899 A1* | 10/2020 | Li ........................ H04W 76/15 |
| 2022/0191687 A1* | 6/2022 | Wifvesson ............ H04L 63/123 |

OTHER PUBLICATIONS

PCT/CN2020/124865 , International Search Report and Written Opinion, Jul. 29, 2021, 9 pages.
3GPP TR 33.853, "3rd Generation Partnership Project; Technical Specification Group Services and System Aspects; Key issues and potential solutions for integrity protection of the user plane; (Release 16)", V1.1.0, Aug. 2020, 4 pages.
3GPP TR 33.853, "3rd Generation Partnership Project; Technical Specification Group Services and System Aspects; Key issues and potential solutions for integrity protection of the user plane; (Release 16)", V1.1.0, Aug. 2020, 41 pages.
Vodafone, "Revision of Updates to S3-171487 (CR to TS 33.401 for Option 3/3a/3x dual connectivity security) following comments", S3-172067 rev S3-172056, 3GPP TSG-SA WG3 Meeting #88 Dali, China. Agenda Item 7.2, Aug. 7-11, 2017, 12 pages.

* cited by examiner

USER PLANE INTEGRITY PROTECTION CONFIGURATION IN EN-DC

TECHNICAL FIELD

This application relates generally to wireless communication systems, including integrity protection of user plane traffic.

BACKGROUND

Wireless mobile communication technology uses various standards and protocols to transmit data between a base station and a wireless mobile device. Wireless communication system standards and protocols can include the 3rd Generation Partnership Project (3G PP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs. RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5 G RAT.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
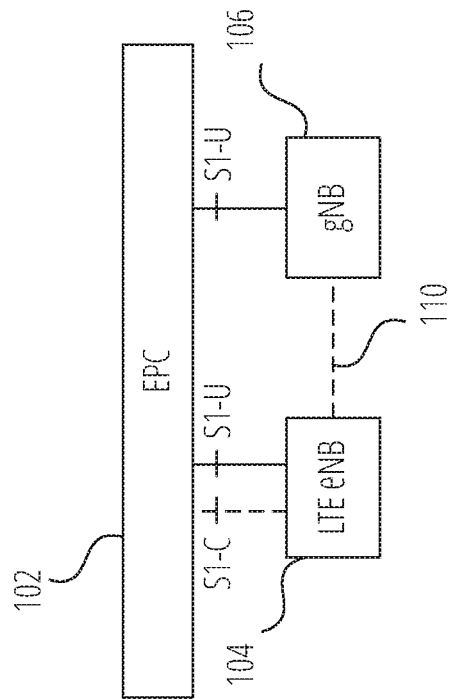
FIG. 1A and FIG. 1B are block diagrams illustrating EN-DC architectures used in certain embodiments.

LTE and NR networks can be implemented in many combinations. See, for example, 3GPP TR 38.801 (clause 7.2). A first option may include an Evolved Universal Terrestrial Radio Access (eUTRA) with an Evolved Packet Core (EPC), a second option may include NR standalone with a 5G Core, a third option may include an EPC based dual connectivity of eUTRA and NR RAT (also referred to as eUTRA-NR dual connectivity or EN-DC), a fourth option may include a 5G Core based dual connectivity (NR master-eUTRA secondary), a fifth option may include a 5G Core with eUTRA, and a sixth option may include a 5G Core based dual connectivity (eUTRA master-NR secondary). Certain embodiments herein are directed to EPC based options, such as the first option (eUTRA with EPC) and the third option (EN-DC). While option 1 is purely LTE (i.e., does not use NR), EN-DC in option 3 is a combination of LTE and NR that may initially be widely deployed as a 4G to 5G interworking solution that gives a migration path to a stand-alone 5G network.

User plane (UP) integrity protection is an enhancement in 5G that is valuable, for example, for the expected Internet of Things (IoT) services. The packet data convergence protocol (PDCP) layer is located in the radio protocol stack in the UMTS/LTE/5G air interface on top of the radio link control (RLC) layer. PDCP provides its services to the radio resource control (RRC) and user plane upper layers. One of the services provided by PDCP is integrity protection (IP). However, as discussed below, UP IP is currently not used in EN-DC.

EN-DC uses existing LTE and EPC infrastructure, thus making new 5G-based radio technology available without network replacement. EN-DC uses LTE as the master radio access technology, while the new radio access technology serves as secondary radio access technology with UEs connected to both radios. Except for capability negotiation, security procedures for EN-DC basically follow the specifications for dual connectivity security for 4G. A master eNB (MeNB) checks whether the UE has 5G NR capabilities to access a secondary gNB (SgNB) and the access rights to the SgNB. The capability and access rights check is to verify that the standard is forward compatible since UEs with different capabilities, including security capabilities, can join the network. The MeNB derives and sends a key to be used by the SgNB for secure communication over NR. The UE also derives the same key. Unlike dual connectivity in 4G networks. RRC messages can be exchanged between the IE and SgNB. Thus keys used for integrity and confidentiality protection of RRC messages as well as UP data are derived.

Although integrity protection for UP data is supported in 5G networks, it is currently not used in the EN-DC case because UP IP is not required to be supported in LTE PDCP. A UE may support both NR PDCP and LTE PDCP, as well as NR PDCP UP IP, from 3GPP Release 15 (R15) onward. However, there is currently no requirement for a UE to support LTE PDCP UP IP. For RAN nodes, a gNB will support NR PDCP UP IP from R15 onward, and an eNB may support LTE PDCP UP IP with relay nodes for LTE. However, there is currently no requirement for LTE PDCP UP IP between an eNB and a UE. Further, in EN-DC, an eNB may support NR PDCP, but UP IP is not currently supported for the NR PDCP.

Thus, certain embodiments herein provide PDCP UP IP for UEs and RAN nodes operating in EN-DC. In an attach procedure, a UE may indicate a UE security capability for support of relay node (RN) PDCP UP IP used in LTE. Based on the indication, an MeNB may act as a donor eNB (DeNB) and the UE may act as a RN for the purposes of using RN PDCP between the UE and the MeNB. Thus, based on the UE security capability, an MeNB security capability, and an SgNB security capability, the MeNB may determine whether to use UP IP between the UE and the MeNB, the UE and the SgNB, and/or in the split bearer between the MeNB and the SgNB.

Figure 1B:
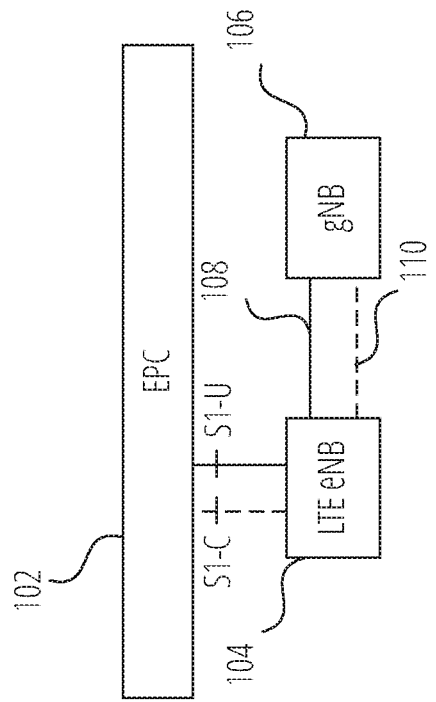

By way of example, FIG. 1A and FIG. 1B are block diagrams illustrating EN-DC architectures used in certain embodiments herein. At a high level, the EN-DC architectures include an EPC 102, an LTE eNB 104, and a gNB 106. The LTE eNB 104 is connected to the EPC through a control plane (CP) S1 interface (S1-C interface) and a UP S1 interface (S1-U interface). The LTE eNB 104 is connected to the EPC 102 with non-standalone NR.

In FIG. 1A, an NR UP connection 108 and an NR CP connection 110 pass from the gNB 106 through the LTE cNB 104 to the EPC 102.

In FIG. 1B, the NR CP connection 110 from the gNB 106 passes through the LTE eNB 104 to the EPC 102. However, the UP connection from the gNB 106 is directly from the gNB 106 to the EPC 102 through an S1-U interface.

Figure 2:
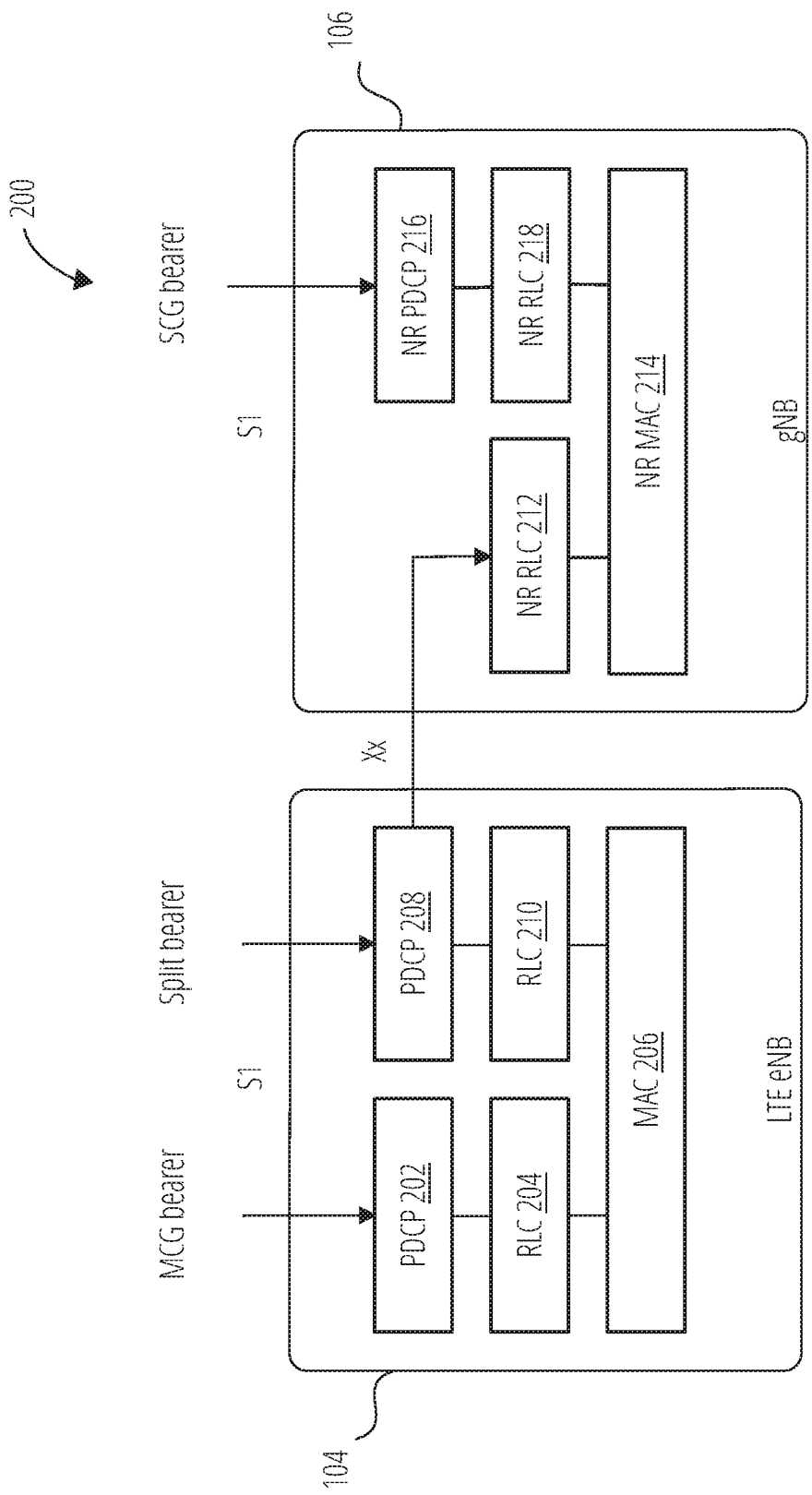
FIG. 2 is a block diagram of a radio protocol architecture for the user plane of EN-DC used in certain embodiments.

By way of example. FIG. 2 is a block diagram of a radio protocol architecture 200 for the user plane of EN-DC used in certain embodiments herein. In dual connectivity (DC), the illustrated LTE eNB 104 may be referred to as an MeNB of a master cell group (MCG) and the illustrated gNB 106 may be referred to as an SgNB of a secondary cell group (SCG). There are two configurations for DC that may be performed in the LTE eNB 104 (as MeNB) and the gNB 106 (as SeNB); a configuration using an MCG bearer and an SCG bearer, and a configuration using a split bearer.

The MCG bearer is a communication bearer that is set up between the LTE eNB 104 and the EPC (e.g., connected to a serving gateway (S-GW) in EPC). The MCG bearer corresponds one-to-one to a radio bearer that is set up between a UE and the LTE eNB 104. The SCG bearer is a communication bearer that is set up between the gNB 106 and the EPC (e.g., the same S-GW or a different S-GW as that connected to the LTE cNB 104). When implementing DC by using the MCG bearer and the SCO bearer, the SCG bearer corresponds one-to-one to a radio bearer that is set up between the UE and the gNB 106.

The split bearer is a communication bearer that is set up between the LTE eNB 104 and the EPC (e.g., S-GW). The split bearer may be associated with a radio bearer that is set up directly between the UE and the LTE eNB 104. Further, the split bearer may be associated with a radio bearer that is set up between the UE and the LTE eNB 104 through the gNB 106. In other words, the LTE cNB 104 transmits data transmitted through a radio bearer that is directly set up between the UE and the LTE eNB 104 and data transmitted through a radio bearer that is set up between the UE and the LTE eNB 104 through the gNB 106 to the EPC through the split bearer. The LTE cNB 104 receives data transmitted from the UE to the gNB 106 through Xx (referred to in certain examples as Xx-U or X2), which is a reference point between the LTE eNB 104 and the gNB 106. The communications using the split bearer may be referred to as aggregation communications.

The LTE cNB 104 includes a protocol stack for an MCG bearer including a PDCP layer (PDCP 202), a radio link control (RLC) layer (RLC 204), and a media access control (MAC) layer (MAC 206). The LTE eNB 104 further includes a protocol stack for the split bearer including a PDCP 208, an RLC 210, and the MAC 206. The gNB 106 also includes a protocol stack for the split bearer, including an NR RLC 212 in communication with the PDCP 208 of the LTE eNB 104 through Xx, and an NR MAC 214. The gNB 106 further includes a protocol stack for the SCG bearer including an NR PDCP 216, an NR RLC 218, and the NR MAC 214. The NR PDCP 216 is one of the NR sub-layers to handle service data units (SDUs) of the S1-U interface into different dedicated radio bearers (DRBs) according to the quality of service (QoS) information associated with the SDU.

Figure 3:
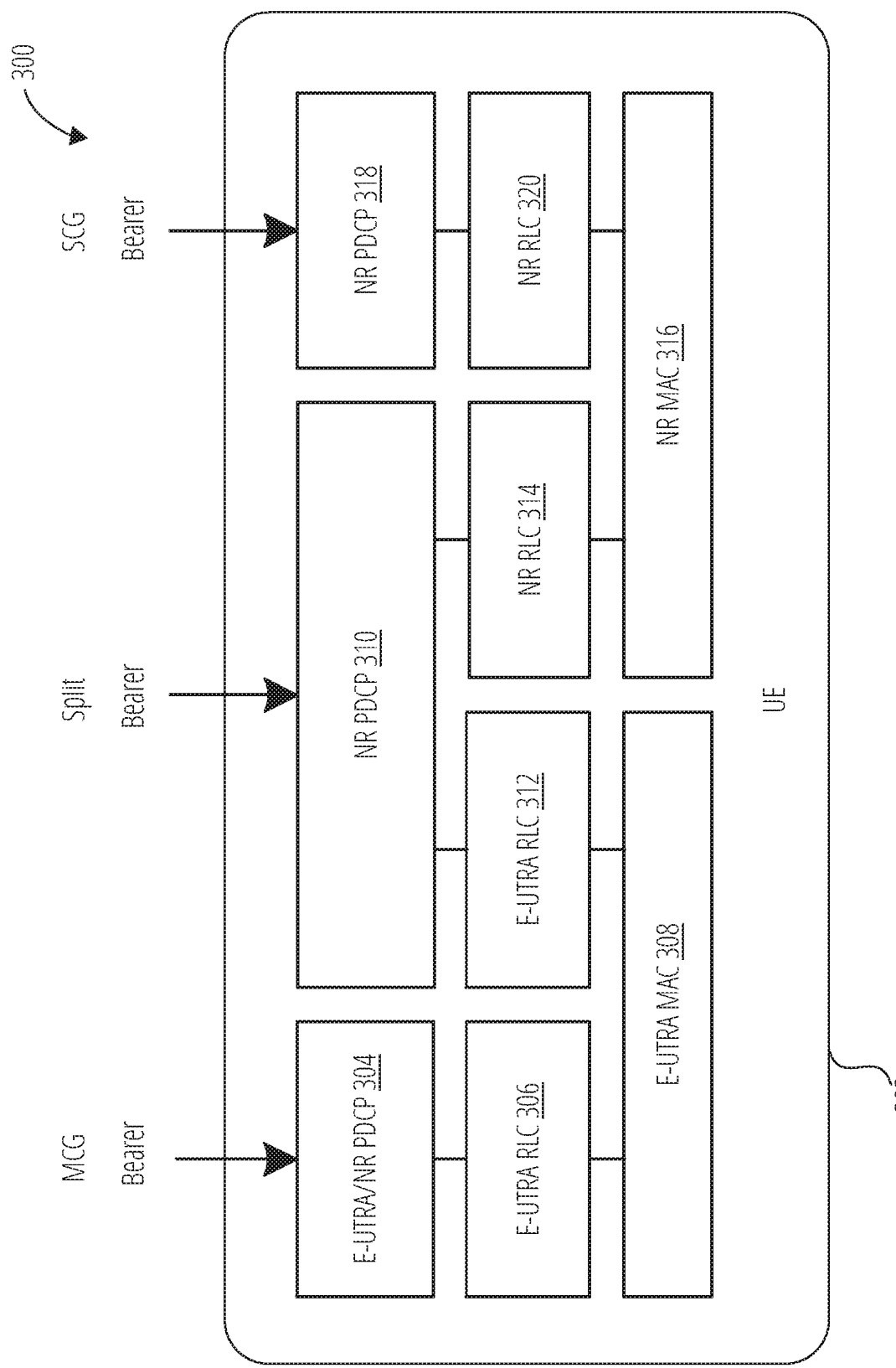
FIG. 3 is a block diagram of a radio protocol architecture for MCG, SCG, and split bearers in the user plane from a perspective of a LE in EN-DC used in certain embodiments.

By way of example, FIG. 3 is a block diagram of a radio protocol architecture 300 for MCG, SCG, and split bearers in the user plane from a perspective of a UE 302 in EN-DC used in certain embodiments herein. A protocol stack for the MCG bearer includes an E-UTRA/NR PDCP 304, an E-UTRA RLC 306, and an E-UTRA MAC 308. A protocol stack for the split bearer includes an NR PDCP 310, an E-UTRA RLC 312 and the E-UTRA MAC 308. The split bearer protocol stack further includes an NR RLC 314 and an NR MAC 316. A protocol stack for the SCG bearer includes an NR PDCP 318, an NR RLC 320, and the NR MAC 316. In E-UTRA connected to EPC, if the UE 302 supports EN-DC, regardless whether EN-DC is configured or not, the network can configure either E-UTRA PDCP or NR PDCP for master node (MN) terminated MCG bearers while NR PDCP is used for other bearers. Change from E-UTRA to NR PDCP or vice-versa can be performed via a reconfiguration procedure (with or without handover), either using release and add of the DRBs or using the full configuration option.

As discussed above, UP IP is currently not supported in stand-alone LTE and/or EN-DC scenarios since UP IP is not required to be supported in LTE PDCP. To enable the UP IP in EN-DC, the following conditions may be supported in certain embodiments: UE supports LTE PDCP UP IP; the eNB supports LTE PDCP UP IP; and the UP IP configuration procedure is ready to enable the UP IP. Currently, however, UP IP is only mandated on the PDCP layer between a relay node (RN) and an eNB, which can be reused between the UE and the eNB. To support EN-DC, according to certain embodiments herein, the UE and the eNB may be updated to support this protocol. In certain embodiments herein it is assumed that the LIE and the eNB are updated to support RN PDCP UP IP used in LTE. Such embodiments provide for configuring the UP IP in EN-DC.

Figure 4:
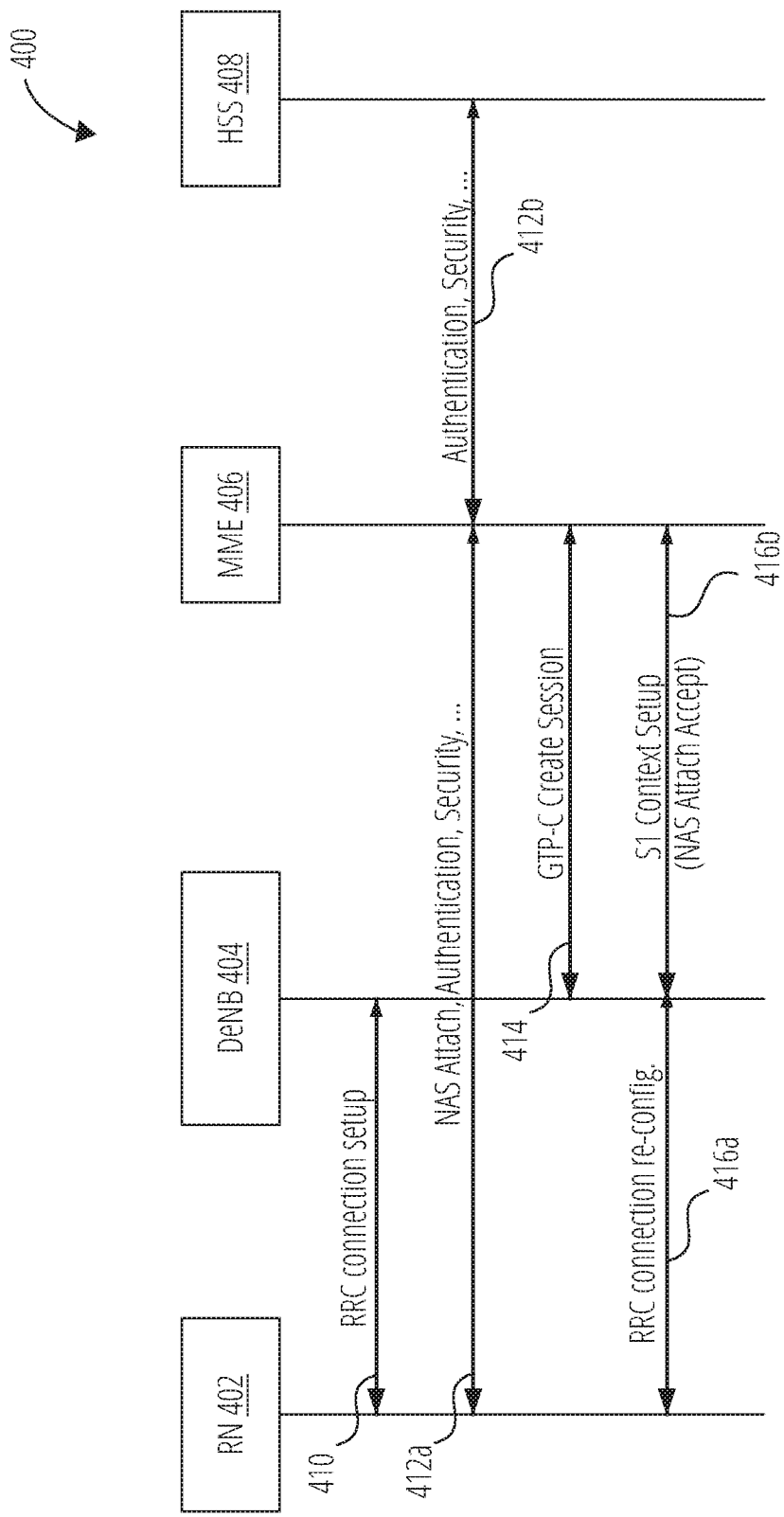
FIG. 4 is a signaling diagram illustrating a simplified attach procedure for an RN that may be modified according to certain embodiments.

FIG. 4 is a signaling diagram illustrating a simplified attach procedure 400 for an RN 402 that may be modified according to certain embodiments. See, for example, 3GPP TS 36.300. The attach procedure 400 may include an RRC connection setup 410, procedures 412a and 412b (non-access stratum (NAS) attach, authentication, security, etc.) between the RN 402 and a mobility management entity (MME) (shown as MME 406) and/or between the MME 406 and a home subscriber server (shown as HISS 408), a GTP-C create session procedure 414, an RRC connection reconfiguration procedure 416a, and an S1 context setup procedure 416b (including a NAS attach accept message).

The attach procedure 400 may be the same as a normal UE attach procedure (e.g., see 3GPP TS 23.401), with the exception that the DeNB 404 has been made aware of which MMEs support RN functionality via the S1 setup response message earlier received from the MMEs; the RN 402 sends an RN indication to the DeNB 404 during RRC connection establishment; after receiving the RN indication from the RN 402, the DeNB 404 sends the RN indicator and the Internet Protocol address of the S-GW/P-GW function embedded in the DeNB 404, within the Initial UE Message, to the MME 406 supporting RN functionality; The MME 406 selects S-GW/P-GW for the RN 402 based on the Internet Protocol address included in the Initial UE Message; and during the attach procedure, the EPC checks if the RN 402 is authorized for relay operation. If the RN 402 is authorized, the EPC accepts the attach and sets up a context with the DeNB 404; otherwise the EPC rejects the attach. The RN 402 is preconfigured with information about which cells (DeNBs) it is allowed to access.

As mentioned above, LTE PDCP UP IP may be supported between the RN 402 and the DeNB 404. For example, 3GPP TS 33.401, clause 5.1.4.1 indicates that user plane packets carrying S1 and X2 messages between the RN 402 and the DeNB 404 may be integrity-protected. Integrity protection for other user plane packets between the RN 402 and the DeNB 404 may be supported. According to 3GPP TS 33.401, the MME 406 configures the integrity security to the RN 402 through an S1 initial context setup message. The MME 406 and the RN 402 may establish NAS security. Upon receipt of the S1 initial context setup message, the DeNB 404 and the RN 402 may set up access stratum (AS) security.

Figure 5:
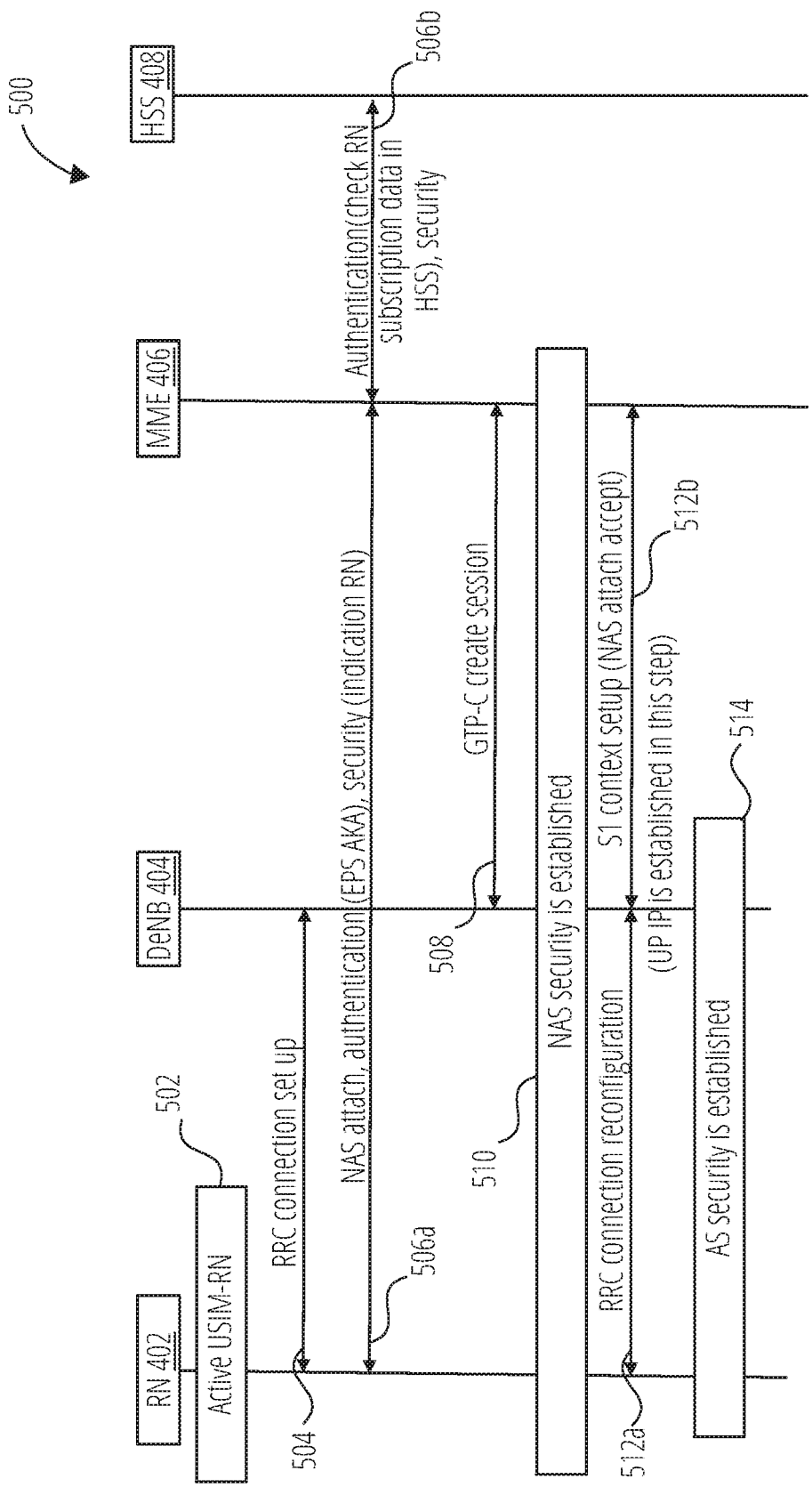
FIG. 5 is a signaling diagram illustrating an attach procedure for the RN with security set up in LTE that may be modified herein to configure the LTE PDCP UP IP to a UE.

For example, FIG. 5 is a signaling diagram illustrating an attach procedure 500 for the RN 402 with security set up in LTE that may be modified herein to configure the LTE PDCP UP IP to a UE. After the RN 402 activates 502, if needed, a Universal Subscriber Identity Module of the RN (USIM-RN), the attach procedure 50) includes an RRC connection set up procedure 504, and procedures 506a and procedures 506b. The procedures 506a may include NAS attach, authentication (Evolved Packet System (EPS) Authentication and Key Agreement (AKA)), and security processes during which an "indication RN" indicates that the RN 402 is a relay node. The procedures 506b may include authentication (check RN subscription data in the HSS 408) and security processes. The attach procedure 500 further includes a GTP-C create session procedure 508. At a block 510, NAS security is established. UP IP is established in an RRC connection reconfiguration procedure 512a and an S1 context setup procedure 512b (including a NAS attach accept message). Then, a process is performed wherein AS security is established 514.

3GPP TS 33.401, Clause D.2.2 provides details for the attach procedure 500 with security setup for the RN 402. In such embodiments, the RN 402 performs the RN attach procedure for EPS using the USIM-RN. In addition, the following security-related steps performed. If the USIM-RN is not already active the RN 402 activates 502 it and establishes a new secure channel according to Ec5, Ec6 in the certificate-based case and Ep2 in the pre-shared key based case respectively. The RN 402 uses the international mobile subscriber identity (IMSI) (or a related Globally Unique Temporary Identity (GUTI)) pertaining to the USIM-RN in the RN attach procedure. In procedures 506a, the S1 Initial UE message indicates that the attachment is for a relay node. Upon receipt of this message, the MME 406 (MME-RN) runs EPS AKA with the RN 402 and the USIM-RN. The RN 402 accepts only authentication responses and keys in an RN attach procedure that were received from the USIM-RN over the Secure Channel. In the procedures 506b, the MME 406 (MME-RN) checks from the RN-specific subscription data received from the HSS 408 that the USIM-RN is permitted for use in RN attach procedures. When this is not the case, but the S1 Initial UE message indicated that the attachment is for an RN, the MME 406 (MME-RN) rejects the Attach request and indicates to the DeNB 404 that the set-up has failed. At block 510, the MME 406 (MME-RN) and the RN 402 establish NAS security. Upon receipt of the S1 INITIAL CONTEXT SETUP message in the S1 context setup procedure 512b (UP IP is established in this step), the DeNB 404 and the RN 402 set up AS security over Un. The RN 402 may establish a secure connection to an Operations. Administration and Maintenance (OAM) server in this phase to complete the configuration.

Figure 6B:
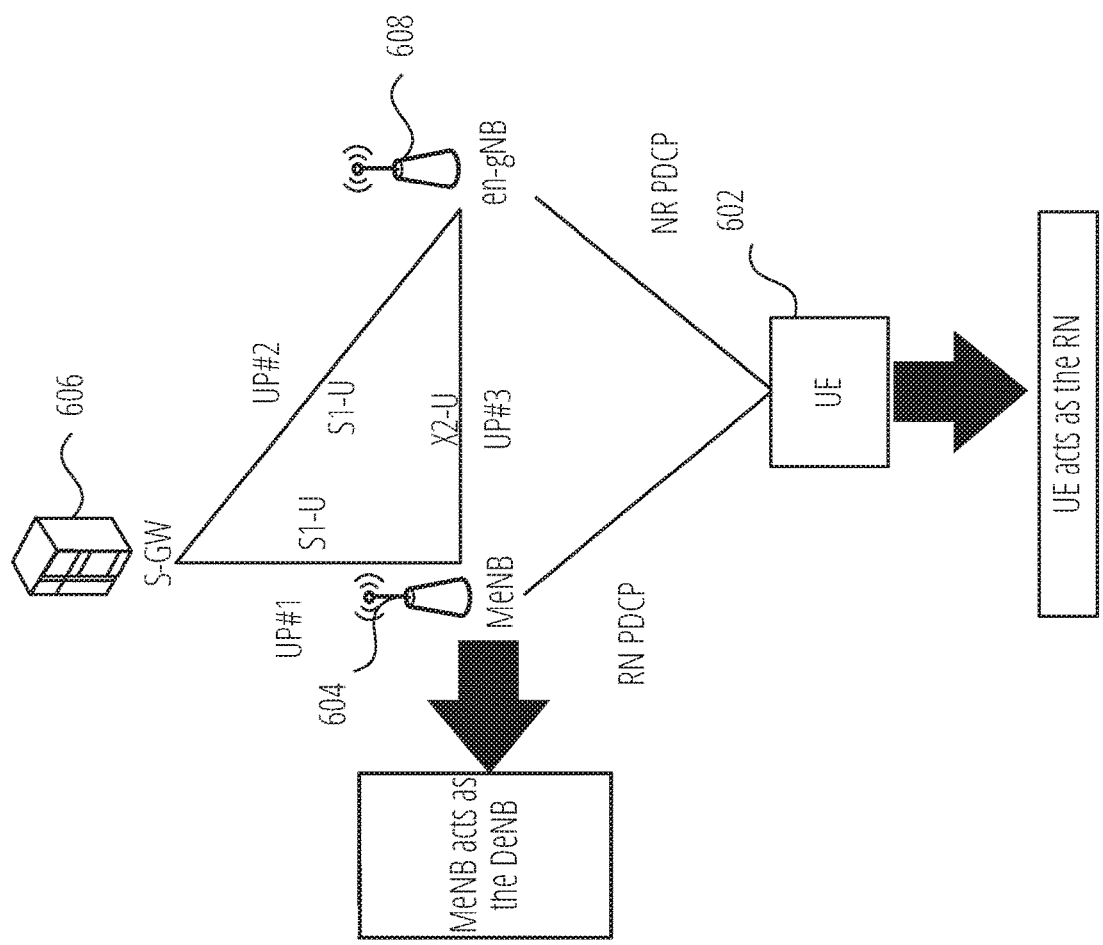
FIG. 6A and FIG. 6B are block diagrams illustrating a simplified EN-DC architecture according to certain embodiments.
Figure 6A:
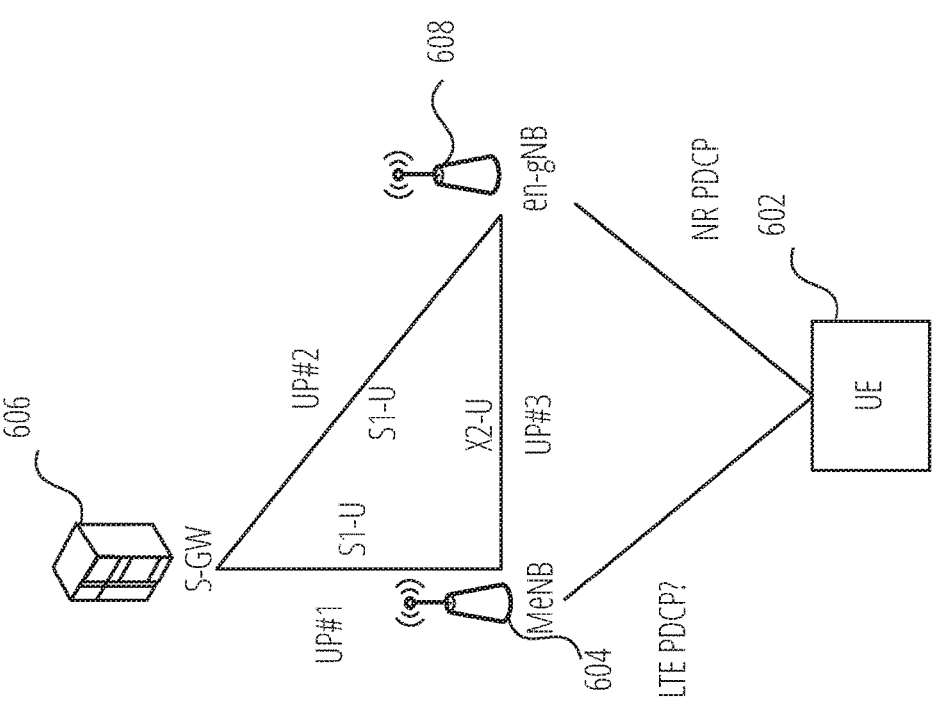

FIG. 6A and FIG. 6B are block diagrams illustrating a simplified EN-DC architecture according to certain embodiments. As discussed above, a UE 602 may be connected to an MeNB 604 having an MCG bearer connection to an S-GW 606 through an S1-U interface (UP #1 connection). The UE 602 may also be connected to an en-gNB 608 (which may be referred to herein as an SgNB) having an SCG bearer connection with the S-GW 606 through an S1-U interface (UP #2 connection). The MeNB 604 has a split bearer connection to the en-gNB 608 through an X2-U interface (UP #3 connection). As shown in FIG. 6A, the UE 602 supports NR PDCP for communication with the en-gNB 608 and may also support NR PDCP with UP IP. However, the UE 602 may not support LTE PDCP for communication with the MeNB 604. Thus, UP IP is not currently used in the EN-DC scenario.

In certain embodiments, however, RN PDCP is reused in the MeNB 604. In such embodiments, as shown in FIG. 6I, the UE 602 is configured to act as a RN and the MeNB 604 is configured to act as a DeNB. Thus, RN PDCP is supported for communication between the UE 602 and the MeNB 604, e.g., using the attach procedure 500 shown in FIG. 5.

Figure 7:
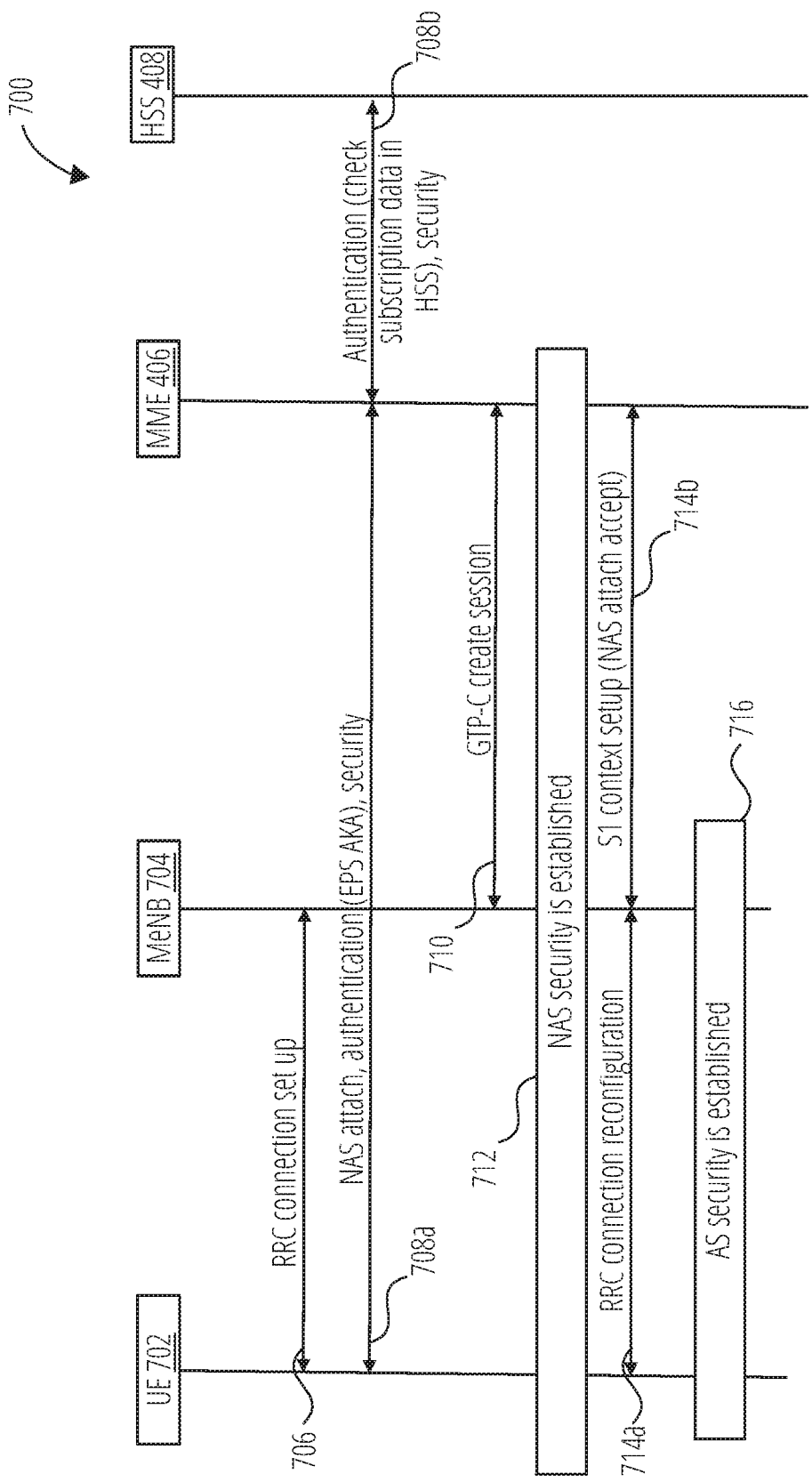
FIG. 7 is a signaling diagram illustrating an RN PDCP UP IP configuration procure wherein the attach procedure shown in FIG. 5 is modified according to one embodiment.

For example, FIG. 7 is a signaling diagram illustrating an RN PDCP UP IP configuration procedure 700) wherein the attach procedure 500 shown in FIG. 5 is modified according to one embodiment. In particular, the RN 402 shown in FIG. 5 is replaced with a UE 702 and the DeNB 404 shown in FIG. 5 is replaced with an MeNB 704. Thus, the RN PDCP UP IP configuration procedure 700 includes an RRC connection set up procedure 706 and procedures 708a for NAS attach, authentication, and security (but without indicating that the attachment is for a relay node). The procedures 708b may include authentication (check subscription data associated with the UE 702 in the HSS 408) and security processes. The RN PDCP UP IP configuration procedure 700 further includes a GTP-C create session procedure 710. At a block 712, NAS security is established. UP IP is established in an RRC connection reconfiguration procedure 714a and an S1 context setup procedure 714b (including a NAS attach accept message). Then, a process is performed wherein AS security is established 716.

Figure 8:
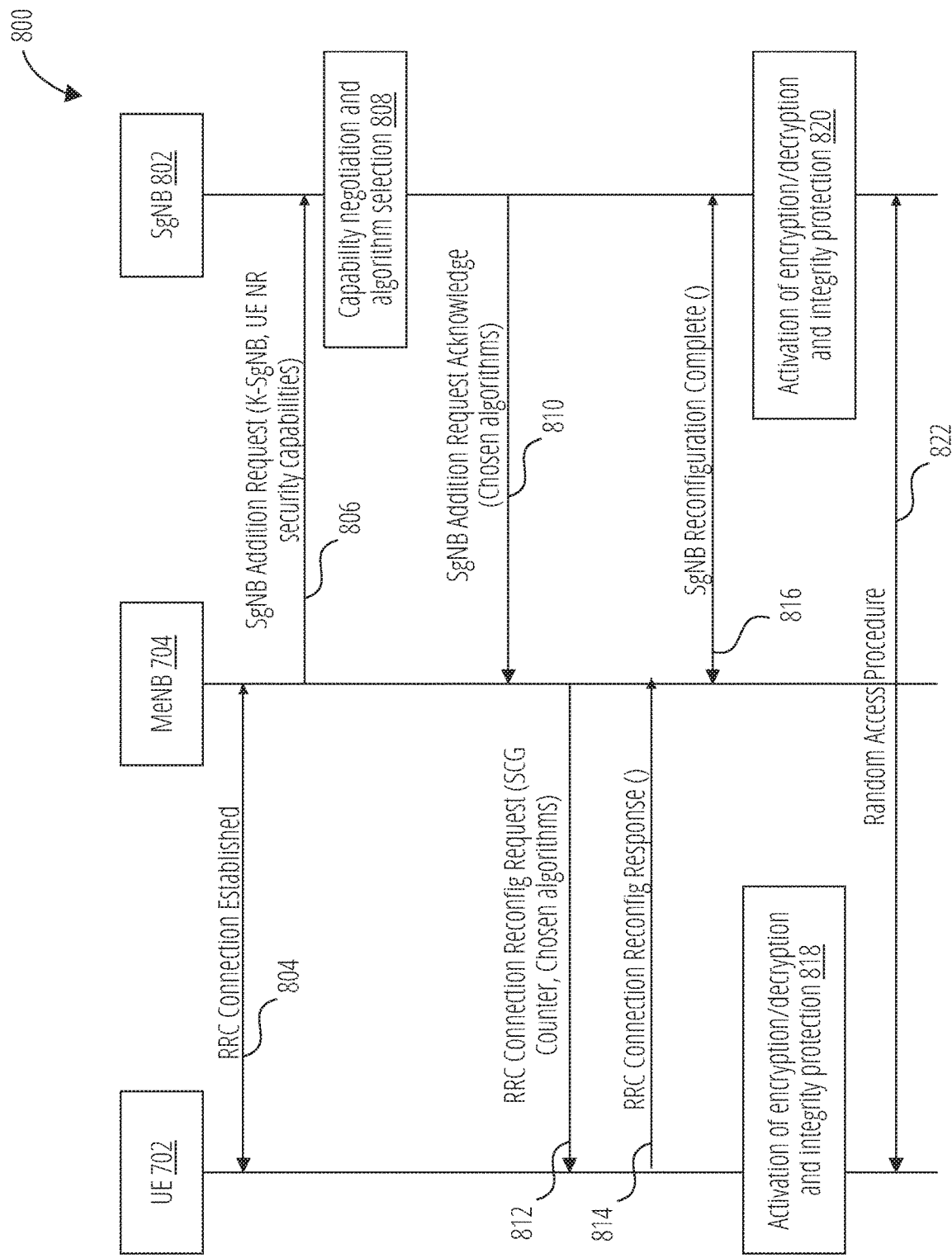
FIG. 8 is a signaling diagram of a SgNB addition procedure that may be used with certain embodiments herein to configure UP IP for EN-DC operation.

In certain embodiments, the RN PDCP UP IP configuration procedure includes adding an SgNB for EN-DC operation. For example. FIG. 8 is a signaling diagram of a SgNB addition procedure 800 that may be used with certain embodiments herein to configure UP IP for EN-DC operation. See, e.g., 3GPP TS 33.401. As discussed above, in current systems, UP IP is not allowed in a SgNB 802 because EPC does not support UP IP. As disclosed herein (e.g., see FIG. 9), however, UP IP may be configured in the SgNB 802 for EN-DC operation.

As shown in FIG. 8. The UE 702 and the MeNB 704 establish 804 an RRC connection. Before the MeNB 704 decides to use dual connectivity for some DRB(s) and/or a signaling radio bearer (SRB) with the SgNB 802, the MeNB 704 checks whether the UE 702 has NR capability and is authorized to access NR. The MeNB 704 sends an SgNB addition request 806 to the SgNB 802 (e.g., over an X2-C interface) to negotiate the available resources, configuration, and algorithms at the SgNB 802. When connected to the EPC, in certain embodiments herein, the MeNB 704 indicates to the SgNB 802 that UP integrity protection may be activated. The MeNB 704 computes and delivers a key (S-$K_{gNB}$) to the SgNB 802 if a new key is needed. The UE NR security capability may also be sent to the SgNB 802.

In block 808, the SgNB 802 allocates the resources and chooses the ciphering algorithm for the DRB(s) and SRB and integrity algorithm if an SRB is to be established which has the highest priority from its configured list and is also present in the UE NR security capability. If a new key (S-KgNB) was delivered to the SgNB 802, then the SgNB 802 calculates $K_{SgNB-UP-enc}$ as well as $K_{SgNB-RRC-int}$ and $K_{SgNB-RRC-enc}$ if an SRB is to be established. The SgNB 802 then sends a SgNB addition request acknowledge 810 to the MeNB 704 indicating availability of requested resources and the identifiers for the selected algorithm(s) to serve the requested DRBs and/or SRB for the UE 702.

The MeNB 704 sends an RRC connection reconfiguration request 812 to the UE 702 instructing it to configure the new DRBs and/or SRB for the SgNB 802. The MeNB 704 may include an SCG counter parameter to indicate that the UE 702 may compute the S-$K_{gNB}$ for the SgNB 802 if a new key is needed. The MeNB 704 forwards the UE configuration parameters (which includes the algorithm identifier(s) received from the SgNB 802) to the UE 702. Since the message is sent over the RRC connection between the MeNB 704 and the UE 702, it is integrity protected using the $K_{RRCint}$ of the MeNB 704. Thus, the SCG counter cannot be tampered with, and the UE 702 can assume that it is fresh.

The UE 702 may accept the RRC connection reconfiguration request 812 and compute the S-$K_{gNB}$ for the SgNB 802 if an SCG counter parameter was included. The UE 702 may also compute $K_{SgNB-UP-enc}$ as well as $K_{SgNB-RRC-int}$ and $K_{SgNB-RRC-enc}$ for the associated assigned DRBs and/or SRB. The UE 702 sends an RRC connection reconfiguration response 814 to the MeNB 704. At block 818, the UE 702 activates the chosen encryption/decryption and integrity protection.

The MeNB 704 sends a SgNB reconfiguration complete 816 to the SgNB 802 (e.g., over the X2-C interface) to inform the SgNB 802 of the configuration result. On receipt of this message, at block 820, the SgNB 802 may activate the chosen encryption/decryption and integrity protection with UE. If the SgNB 802 does not activate encryption/decryption and integrity protection with the UE 702 at this stage, SgNB 802 may activate encryption/decryption and integrity protection upon receiving a Random Access request from the UE 702 in a random access procedure 822.

Figure 9:
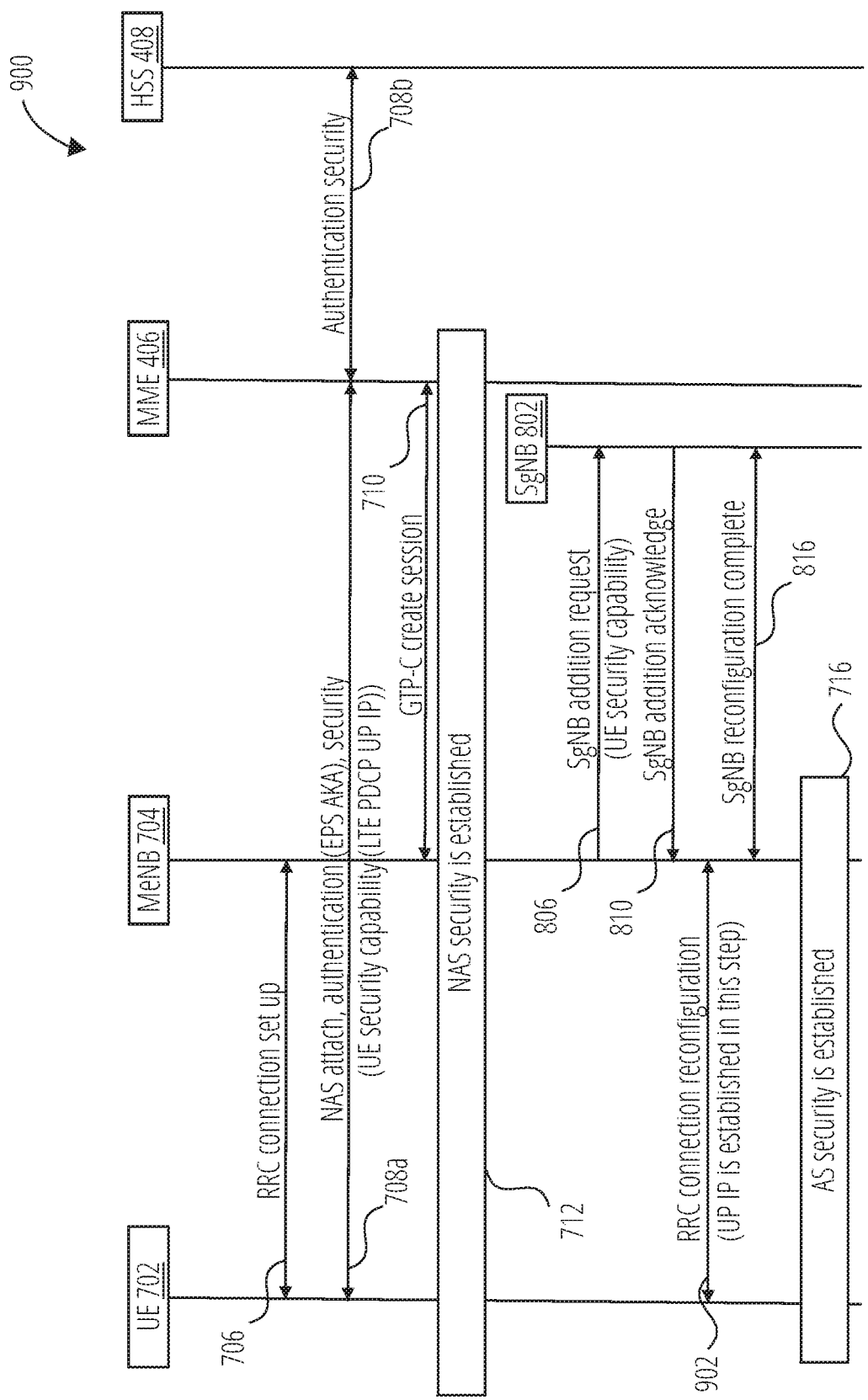
FIG. 9 is a signaling diagram for a UP IP activation procedure according to certain embodiments.

FIG. 9 is a signaling diagram for a UP IP activation procedure 900 according to certain embodiments. In this example, the UE 702 and the MeNB 704 are configured to support RN PDCP UP IP in LTE. FIG. 9 shows the UP IP configuration in EN-DC when RN PDCP UP IP is reused between the UE 702 and the MeNB 704. The UP IP activation procedure 900 includes an RRC connection set up procedure 706 and procedures 708a for NAS attach, authentication (e.g., EPS AKA), and security. The procedures 708a may include a series of messages for a NAS registration procedure, a primary authentication procedure, and a NAS security mode command (SMC) procedure. As shown, the LIE 702 is configured to provide a LIE security capability indication (e.g., in a protocol data unit (PDU) in a protocol session establishment request) to indicate to the MME 406 whether or not the UE supports LTE PDCP UP IP. Based on the information of whether UE 702 supports LTE PDCP UP IP, and whether the MeNB 704 supports LTE PDCP UP IP, the MME 406 decides whether to activate the UP IP in the MeNB 704. The procedures 708b may include authentication (check subscription data associated with the UE 702 in the HSS 408) and security processes.

After the procedures 708a and the procedures 708b, NAS security is established. Since the MeNB 704 support the RN PDCP UPIP, the MME 406 can configure the UP security policy to the MeNB 704 in the S1 INITIAL CONTEXT SETUP message.

The UP IP activation procedure 900 further includes a GTP-C create session procedure 710. At a block 712, NAS security is established.

The MeNB 704 then performs an MeNB-initiated SgNB addition procedure, as discussed herein with respect to FIG. 8. A portion of the SgNB addition procedure is shown in FIG. 9. For example, the MeNB 704 checks whether the UE 702 has NR capability and is authorized to access NR. The MeNB 704 sends an SgNB addition request 806 to the SgNB 802 (e.g., over the X2-C interface) to negotiate the available resources, configuration, and algorithms at the SgNB. When connected to the EPC, the MeNB 704 indicates to the SgNB 802 that UP integrity protection can be activated. The MeNB 704 computes and delivers the S-$K_{gNB}$ to the SgNB 802 if a new key is needed. The UE NR security capability may also be sent to the SgNB 802.

The SgNB 802 allocates the resources and chooses the ciphering algorithm for the DRB(s) and SRB and integrity algorithm if DRB(s) and SRB is to be established which has the highest priority from its configured list and is also present in the UE NR security capability. If a new S-KgNB was delivered to the SgNB 802, then the SgNB 802 calculates $K_{SgNB-UP-enc}$ as well as $K_{SgNB-RRC-int}$ and $K_{SgNB-RRC-enc}$ if an SRB is to be established. The SgNB 802 sends an SgNB addition request acknowledge 810 to the MeNB 704 indicating availability of requested resources and the identifiers for the selected algorithm(s) to serve the requested DRBs and/or SRB for the UE 702.

As discussed herein (e.g., see Table 1 and FIG. 10), the MeNB 704 makes decisions on the UP path selection based on UE capability (e.g., the UE security capability indicating support for LTE PDCP UP IP). MeNB capability and SgNB capability. In an RRC connection reconfiguration 902, the MeNB 704 sends an RRC connection reconfiguration request to the UE 702 instructing it to configure the new DRBs and/or SRB for the SgNB 802. The MeNB 704 forwards the UE configuration parameters (which includes the algorithm identifier(s) received from the SgNB 802) to the UE 702. The UE 702 sends an RRC reconfiguration complete to the MeNB 704. The UE 702 may then activate the chosen encryption/decryption and integrity protection at this point.

The MeNB 704 sends a SgNB reconfiguration complete 816 message to the SgNB 802 (e.g., over the X2-C interface) to inform the SgNB 802 of the configuration result. On receipt of this message, the SgNB 802 may activate the chosen encryption/decryption and integrity protection with UE. If the SgNB 802 does not activate encryption/decryption and integrity protection with the UE 702 at this stage, the SgNB 802 may activate encryption/decryption and integrity protection upon receiving a Random Access request from the UE 702. Then, a process may be performed wherein AS security is established 716.

As mentioned above, an MeNB may make a UP IP decision or determine a UP path based on UE capability (e.g., the UE security capability indicating support for LTE PDCP UP IP), MeNB capability and SgNB capability. In 3GPP R15 and R16, NR PDCP in EN-DC does not support UP IP. Therefore, there may be two different implementations in the MeNB: M1: Supports RN PDCP UP IP used in LTE+NR PDCP without UP IP; and M2: Not support RN PDCP UP IP used in LTE+NR PDCP without UP IP.

For 3GPP R15 and beyond, the UE supports NR PDCP UP IP. Thus, there may be two different implementations for the UE: U1: Supports RN PDCP UP IP used in LTE+NR PDCP with UP IP; and U2: Not support RN PDCP UP IP used in LTE+NR PDCP with UP IP.

Thus, in certain embodiments, the MeNB may select between four policy decisions, as shown in Table 1, based on the UE capability (U1 or U2), the MeNB capability (M1 or M2), and the SgNB capability NR PDCP with UP IP.

TABLE 1

|  | Policy #1 | Policy #2 | Policy #3 | Policy #4 |
| --- | --- | --- | --- | --- |
| UE capability | U2: Not support RN PDCP UP IP used in LTE + NR PDCP with UP IP | U2: Not support RN PDCP UP IP used in LTE + NR PDCP with UP IP | U1: Supports RN PDCP UP IP used in LTE + NR PDCP with UP IP | U1: Supports RN PDCP UP IP used in LTE + NR PDCP with UP IP |
| MN(eNB) capability | M1: Supports RN PDCP UP IP used in LTE + NR PDCP without UP IP | M2: Not support RN PDCP UP IP used in LTE + NR PDCP without UP IP | M1: Supports RN PDCP UP IP used in LTE + NR PDCP without UP IP | M2: Not support RN PDCP UP IP used in LTE + NR PDCP without UP IP |
| SN(gNB) capability | NR PDCP with UP IP | NR PDCP with UP IP | NR PDCP with UP IP | NR PDCP with UP IP |
| UP IP decision | UP IP on SCG or Split bearer | UP IP on SCG or Split bearer | UP IP on MCG or SCG or Split bearer | UP IP on SCG or Split bearer |

Figure 10:
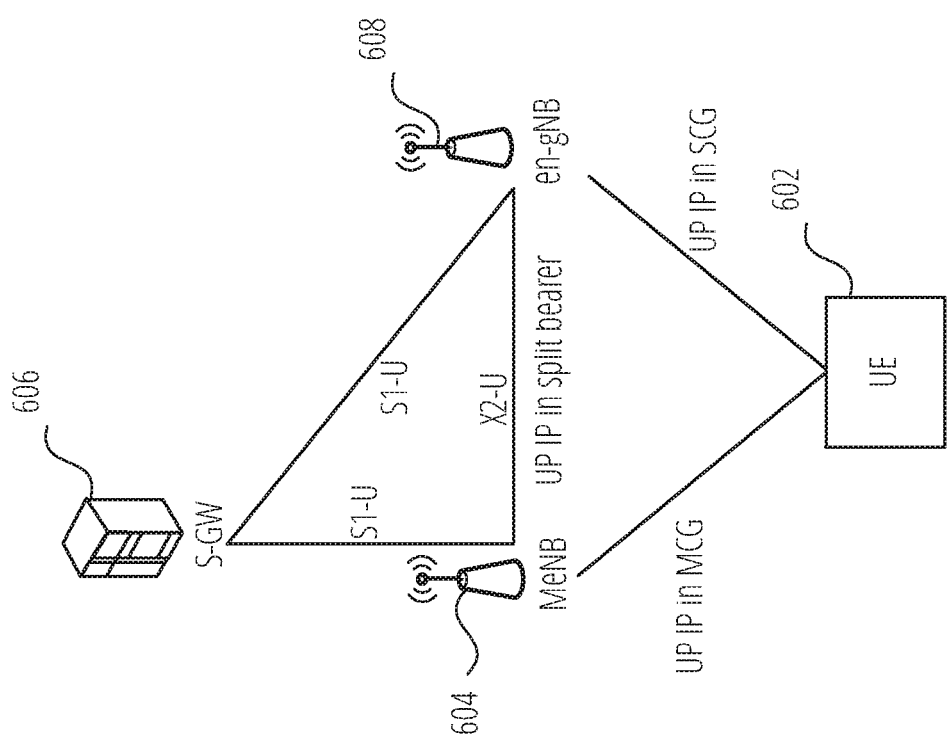
FIG. 10 is a block diagram illustrating potential UP IP decisions for the simplified EN-DC architecture shown in FIG. 6A and FIG. 6B according to one embodiment.

FIG. 10 is a block diagram illustrating potential UP IP decisions for the simplified EN-DC architecture shown in FIG. 6A and FIG. 6B according to one embodiment. With reference to Table 1 and FIG. 10, for Policy #1, Policy #2, or Policy #4, the MeNB may select a UP path with UP IP on the SCG (between the UE 602 and the en-gNB 608) and/or the split bearer (between the MeNB 604 and the en-gNB 608). For Policy #3, the MeNB may select a UP path with UP IP on the MCG (between the UE 602 and the MeNB 604), the SCG (between the UE 602 and the en-gNB 608) and/or the split bearer (between the MeNB 604 and the en-gNB 608).

Figure 11:
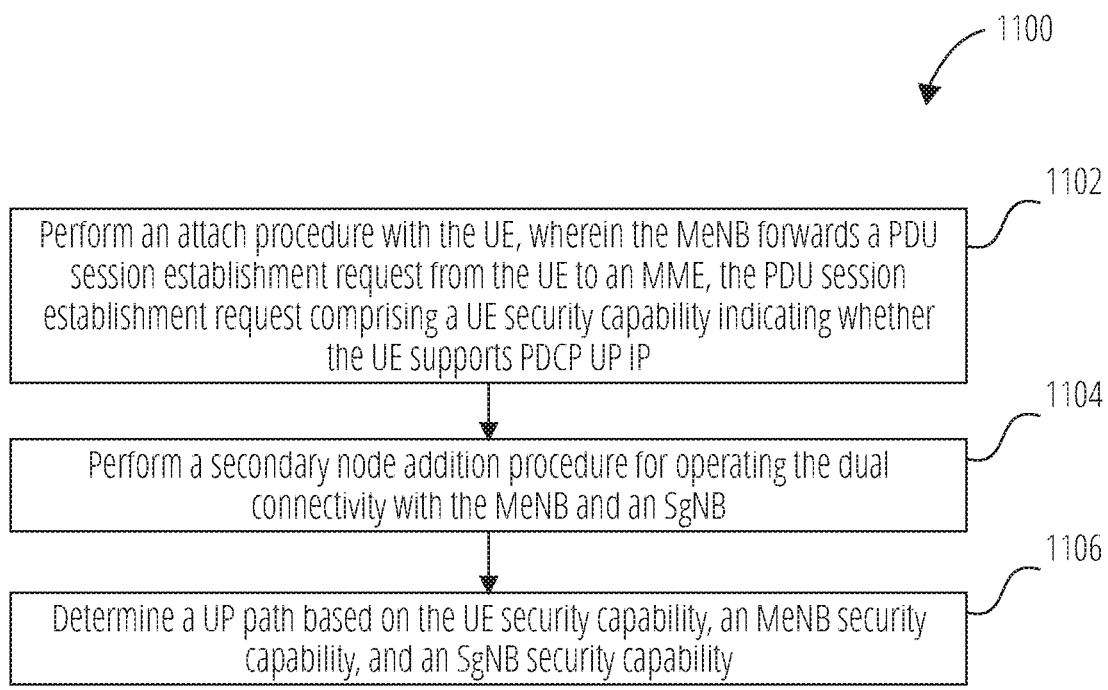
FIG. 11 is a flowchart of a method for an MeNB to configure UP IP for a UE that supports EN-DC according to certain embodiments.

FIG. 11 is a flowchart of a method 1100 for an MeNB to configure UP IP for a LIE that supports EN-DC according to certain embodiments. In block 1102, the method 1100 includes performing an attach procedure with the UE, wherein the MeNB forwards a PDU session establishment request from the UE to an MME. The PDU session establishment request includes a UE security capability indicating whether the UE supports PDCP UP IP. In block 1104, the method 110) includes performing a secondary node addition procedure for operating the dual connectivity with the MeNB and an SgNB. In block 1106, the method 1100 includes determining a UP path based on the UE security capability, an MeNB security capability, and an SgNB security capability.

In certain embodiments of the method 1100, support for the PDCP UP IP comprises support for relay node (RN) PDCP UP IP used in LTE, and the SgNB security capability corresponds to the SgNB supporting NR PDCP with UP IP. The UE security capability may further indicate whether the UE supports the NR PDCP with UP IP. The MeNB security capability may indicate whether the MeNB supports the RN PDCP UP IP used in LTE and NR PDCP without UP IP.

In one embodiment of the method 1100, determining the UP path comprises selecting to use UP IP on at least one of a secondary cell group (SCG) bearer and a split bearer based on: determining that the UE does not support the RN PDCP UP IP used in LTE and that the UE supports the NR PDCP with UP IP; and determining that the MeNB supports the RN PDCP UP IP used in LTE and that the MeNB supports the NR PDCP without UP IP.

In one embodiment of the method 1100, determining the UP path comprises selecting to use UP IP on at least one of a secondary cell group (SCG) bearer and a split bearer based on: determining that the UE does not support the RN PDCP UP IP used in LTE and that the UE supports the NR PDCP with UP IP; and determining that the MeNB does not support the RN PDCP UP IP used in LTE and that the MeNB supports the NR PDCP without UP TP.

In one embodiment of the method 1100, determining the UP path comprises selecting to use UP IP on at least one of a master cell group (MCG) bearer, a secondary cell group (SCG) bearer, and a split bearer based on: determining that the UE supports the RN PDCP UP IP used in LTE and that the UE supports the NR PDCP with UP IP; and determining that the MeNB supports the RN PDCP UP IP used in LTE and that the MeNB supports the NR PDCP without UP IP.

In one embodiment of the method 1100, determining the UP path comprises selecting to use UP IP on at least one of a secondary cell group (SCG) bearer and a split bearer based on: determining that the UE supports the RN PDCP UP IP used in LTE and that the UE supports the NR PDCP with UP IP; and determining that the MeNB does not support the RN PDCP UP IP used in LTE and that the MeNB supports the NR PDCP without UP IP.

In one embodiment of the method 1100, performing the attach procedure includes receiving, from the MME, an S1 initial context setup message from the MME to configure a UP security policy to the MeNB.

Figure 12:
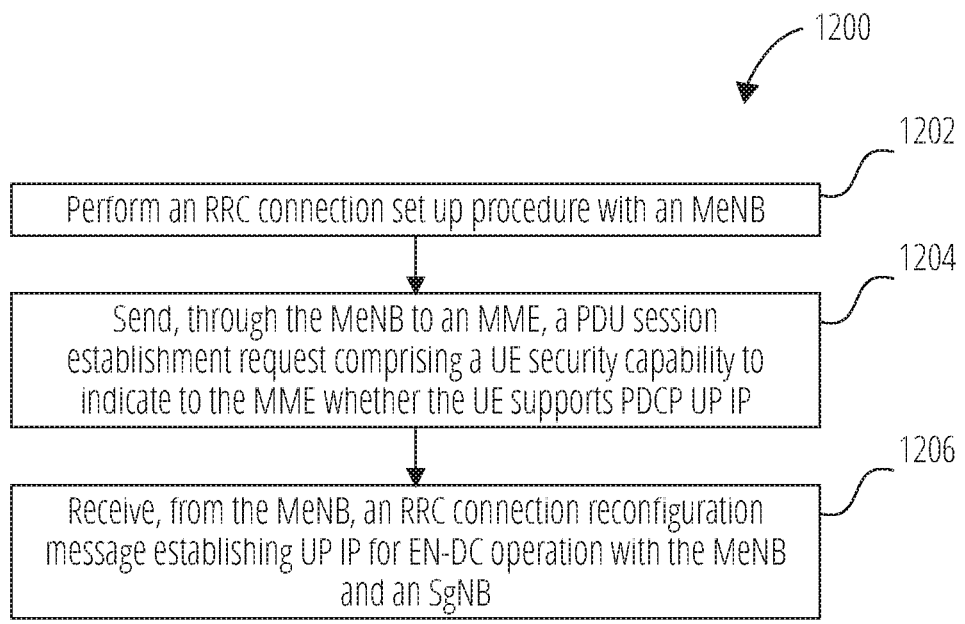
FIG. 12 is a flowchart of a method for a UE according to certain embodiments.

In one embodiment of the method 1100, performing the secondary node addition procedure includes providing an indicate from the MeNB to the SgNB that UP IP can be activated, FIG. 12 is a flowchart of a method 1200 for a UE according to certain embodiments. In block 1202, the method 1200 includes performing an RRC connection set up procedure with an MeNB. In block 1204, the method 1200 includes sending, through the MeNB to an MME, a PDU session establishment request comprising a UE security capability to indicate to the MME whether the UE supports PDCP UP IP. In block 1206, the method 1200 includes receiving, from the MeNB, an RRC connection reconfiguration message establishing UP IP for EN-DC operation with the MeNB and an SgNB.

In one embodiment of the method 1200, the UE security capability indicates that the UE supports relay node PDCP UP IP used in LTE and that the UE supports NR PDCP with UP IP. In addition, or in other embodiments, the RRC connection reconfiguration message establishes that UP IP is to be used for at least one of an MCG bearer, an SCG bearer, and a split bearer.

In one embodiment of the method 1200, the UE security capability indicates that the UE does not support relay node PDCP UP IP used in LTE and that the UE supports NR PDCP with UP IP. In addition, or in other embodiments, the RRC connection reconfiguration message establishes that UP IP is to be used for at least one of an SCG bearer and a split bearer.

Figure 13:
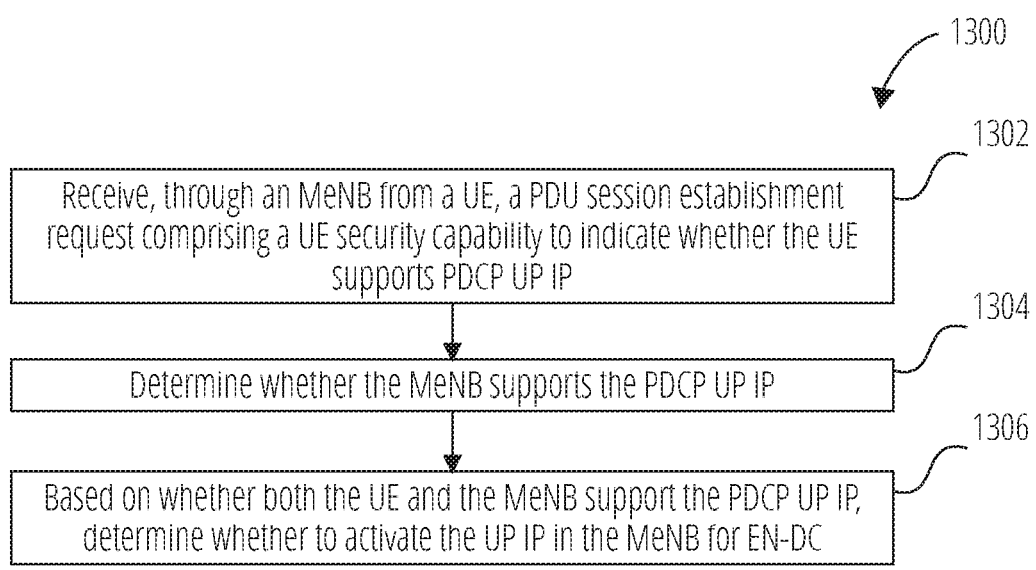
FIG. 13 is a flowchart of a method for an MME according to certain embodiments.

FIG. 13 is a flowchart of a method 13400 for an MME according to certain embodiments. In block 1302, the method 1300 includes receiving, through an MeNB from a UE, a PDU session establishment request comprising a UE security capability to indicate whether the UE supports PDCP UP IP. In block 1304, the method 1300 includes determining whether the MeNB supports the PDCP UP IP. In block 1306, the method 1300 includes, based on whether both the UE and the MeNB support the PDCP UP IP, determining whether to activate the UP IP in the MeNB for EN-DC.

In one embodiment of the method 1300, the PDCP UP IP comprises relay node (RN) PDCP UP IP used in LTE.

In one embodiment, the 1300 further includes generating an S1 initial context setup message to configure an UP security policy to the MeNB.

Figure 14:
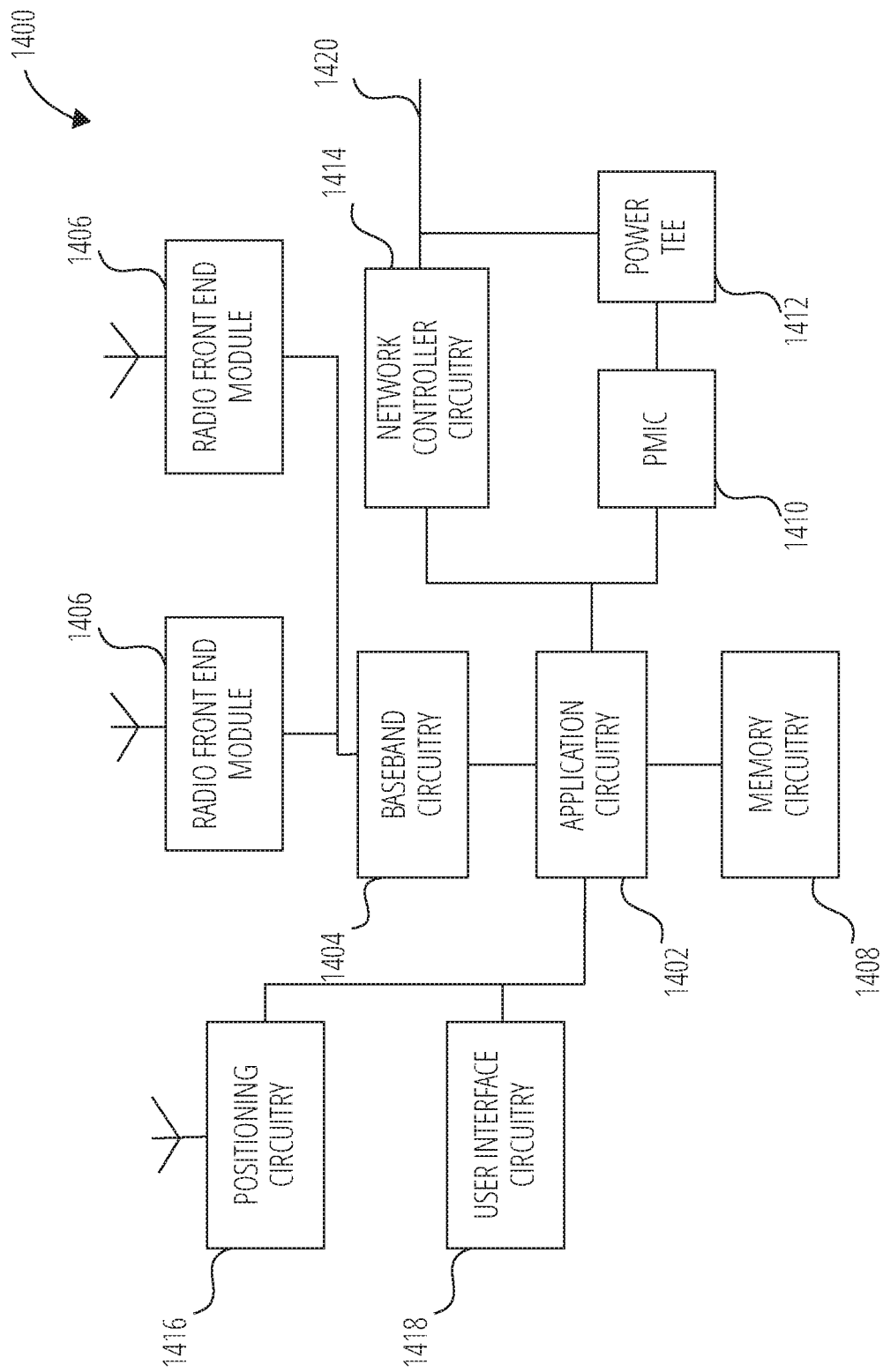
FIG. 14 illustrates an infrastructure equipment in accordance with one embodiment.

FIG. 14 illustrates an example of infrastructure equipment 1400 in accordance with various embodiments. The infrastructure equipment 1400 may be implemented as a base station, radio head, RAN node, AN, application server, and/or any other element/device discussed herein. In other examples, the infrastructure equipment 1400 could be implemented in or by a UE.

The infrastructure equipment 1400 includes application circuitry 1402, baseband circuitry 1404, one or more radio front end module 1406 (RFEM), memory circuitry 1408, power management integrated circuitry (shown as PMIC 1410), power tee circuitry 1412, network controller circuitry 1414, network interface connector 1420, satellite positioning circuitry 1416, and user interface circuitry 1418. In some embodiments, the device infrastructure equipment 1400 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 1402 includes circuitry such as, but not limited to one or more processors (or processor cores), cache memory, and one or more of low drop-out voltage regulators (LDOs), interrupt controllers, serial interfaces such as SPI, I$^2$C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor interface (MIPI) interfaces and Joint Test Access Group (JTAG) test access ports. The processors (or cores) of the application circuitry 1402 may be coupled with or may include memory/storage elements and may be configured to execute instructions stored in the memory/storage to enable various applications or operating systems to run on the infrastructure equipment 1400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1402 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1402 may comprise, or may be, a special-purpose processor/controller to operate according to the various embodiments herein. As examples, the processor(s) of application circuitry 1402 may include one or more Intel Pentium®, Core®, or Xeon® processor(s);

Advanced Micro Devices (AMD) Ryzen® processor(s), Accelerated Processing Units (APUs), or Epyck® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 1400 may not utilize application circuitry 1402, and instead may include a special-purpose processor/controller to process IP data received from an EPC or 5GC, for example.

In some implementations, the application circuitry 1402 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1402 may comprise logic blocks or logic fabric, and other interconnected resources that may be programmed to perform various functions, such as the procedures, methods, functions, etc, of the various embodiments discussed herein. In such embodiments, the circuitry of application circuitry 1402 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 1404 may be implemented, for example, as a solder-down substrate including one or more integrated circuits, a single packaged integrated circuit soldered to a main circuit board or a multi-chip module containing two or more integrated circuits.

The user interface circuitry 1418 may include one or more user interfaces designed to enable user interaction with the infrastructure equipment 1400 or peripheral component interfaces designed to enable peripheral component interaction with the infrastructure equipment 1400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 1406 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1406, which incorporates both mmWave antennas and sub-mmWave.

The memory circuitry 1408 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 1408 may be implemented as one or more of solder down packaged integrated circuits, socketed memory modules and plug-in memory cards.

The PMIC 1410 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1412 may provide for electrical power drawn from a network cable to provide both power supply and data connectivity to the infrastructure equipment 1400 using a single cable.

The network controller circuitry 1414 may provide connectivity to a network using a standard network interface protocol such as Ethernet. Ethernet over GRE Tunnels, Ethernet over Multiprotocol Label Switching (MPLS), or some other suitable protocol. Network connectivity may be provided to/from the infrastructure equipment 1400 via network interface connector 1420 using a physical connection, which may be electrical (commonly referred to as a "copper interconnect"), optical, or wireless. The network controller circuitry 1414 may include one or more dedicated processors and/or FPGAs to communicate using one or more of the aforementioned protocols. In some implementations, the network controller circuitry 1414 may include multiple controllers to provide connectivity to other networks using the same or different protocols.

The positioning circuitry 1416 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System. China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1416 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1416 may include a Micro-Technology for Positioning, Navigation, and Timing (Micro-PNT) IC that uses a master timing clock to perform position tracking/estimation without GNSS assistance. The positioning circuitry 1416 may also be part of, or interact with, the baseband circuitry 1404 and/or radio front end module 1406 to communicate with the nodes and components of the positioning network. The positioning circuitry 1416 may also provide position data and/or time data to the application circuitry 1402, which may use the data to synchronize operations with various infrastructure, or the like. The components shown by FIG. 14 may communicate with one another using interface circuitry, which may include any number of bus and/or interconnect (IX) technologies such as industry standard architecture (ISA), extended ISA (EISAI, peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an I²C interface, an SPI interface, point to point interfaces, and a power bus, among others.

Figure 15:
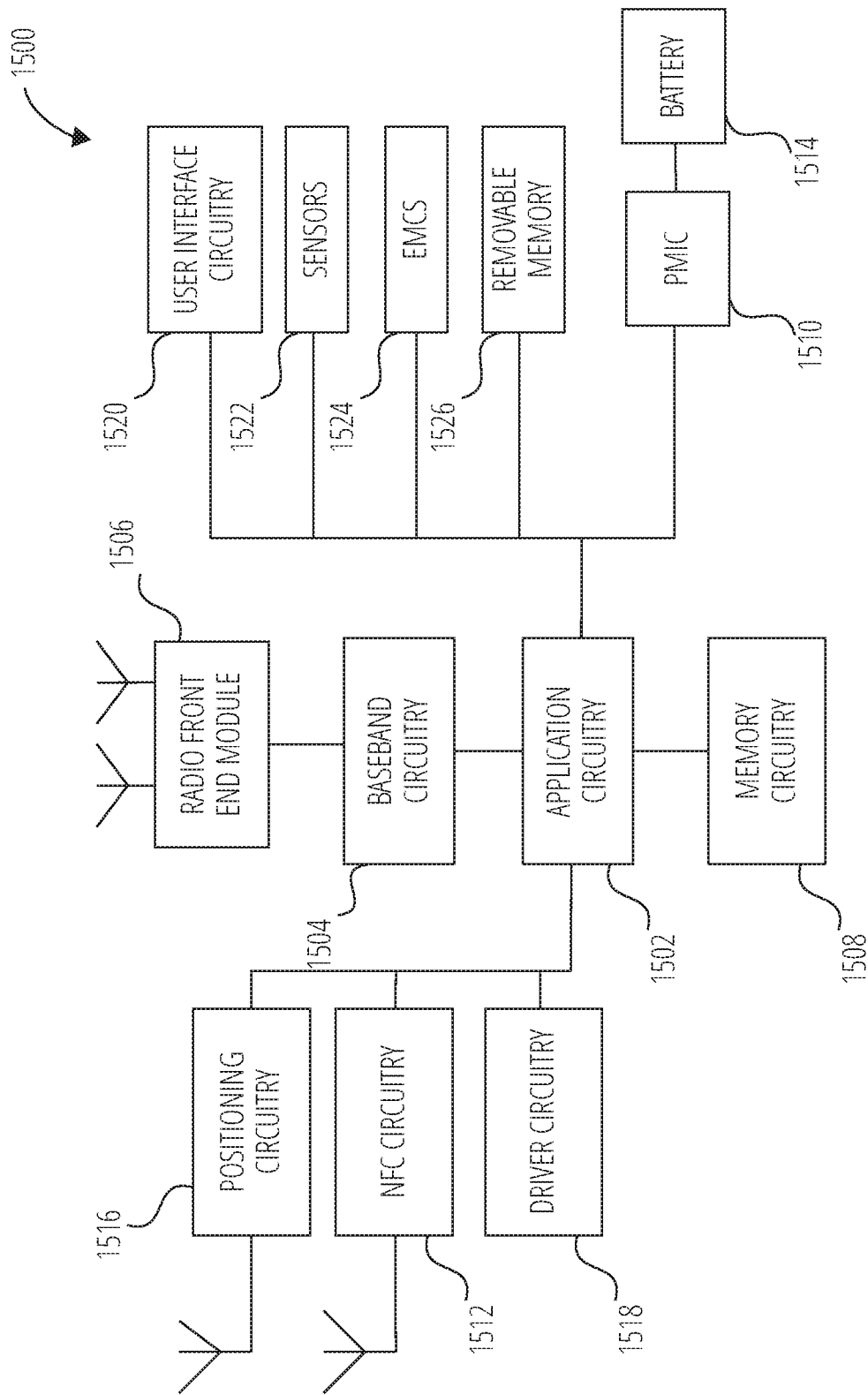
FIG. 15 illustrates a platform in accordance with one embodiment.

FIG. 15 illustrates an example of a platform 1500 in accordance with various embodiments. In embodiments, the computer platform 1500 may be suitable for use as UEs, application servers, and/or any other element/device discussed herein. The platform 1500 may include any combinations of the components shown in the example. The components of platform 1500 may be implemented as integrated circuits (ICs), portions thereof, discrete electronic devices, or other modules, logic, hardware, software, firmware, or a combination thereof adapted in the computer platform 1500, or as components otherwise incorporated within a chassis of a larger system. The block diagram of FIG. 15 is intended to show a high level view of components of the computer platform 1500. However, some of the components shown may be omitted, additional components may be present, and different arrangement of the components shown may occur in other implementations.

Application circuitry 1502 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 1502 may be coupled with or may include memory/storage elements and may be configured to execute instructions stored in the memory/storage to enable various applications or operating systems to run on the platform 1500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1502 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1502 may comprise, or may be, a special-purpose processor/controller to operate according to the various embodiments herein.

As examples, the processor(s) of application circuitry 1502 may include an Intel® Architecture Core™ based processor, such as a Quark™, an Atom™, an i3, an i5, an i7, or an MCU-class processor, or another such processor available from Intel® Corporation. The processors of the application circuitry 1502 may also be one or more of Advanced Micro Devices (AMD) Ryzen®-processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies. Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1502 may be a part of a system on a chip (SoC) in which the application circuitry 1502 and other components are formed into a single integrated circuit, or a single package, such as the Edison™ or Galilco™ SoC boards from Intel® Corporation.

Additionally or alternatively, application circuitry 1502 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1502 may comprise logic blocks or logic fabric, and other interconnected resources that may be programmed to perform various functions, such as the procedures, methods, functions, etc, of the various embodiments discussed herein. In such embodiments, the circuitry of application circuitry 1502 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1504 may be implemented, for example, as a solder-down substrate including one or more integrated circuits, a single packaged integrated circuit soldered to a main circuit board or a multi-chip module containing two or more integrated circuits.

The radio front end module 1506 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1506, which incorporates both mmWave antennas and sub-mmWave.

The memory circuitry 1508 may include any number and type of memory devices used to provide for a given amount of system memory. As examples, the memory circuitry 1508 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 1508 may be developed in accordance with a Joint Electron Devices Engineering Council (JEDEC) low power double data rate (LPDDR)-based design, such as LPDDR2, LPDDR3, LPDDR4, or the like. Memory circuitry 1508 may be implemented as one or more of solder down packaged integrated circuits, single die package (SDP), dual die package (DDP) or quad die package (Q17P), socketed memory modules, dual inline memory modules (DIMMs)

including microDIMMs or MiniDIMMs, and/or soldered onto a motherboard via a ball grid array (BGA). In low power implementations, the memory circuitry 1508 maybe on-die memory or registers associated with the application circuitry 1502. To provide for persistent storage of information such as data, applications, operating systems and so forth, memory circuitry 1508 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 1500 may incorporate the three-dimensional (3D) cross-point (XPOINT) memories from Intel® and Micron®.

The removable memory 1526 may include devices, circuitry, enclosures/housings, ports or receptacles, etc. used to couple portable data storage devices with the platform 1500. These portable data storage devices may be used for mass storage purposes, and may include, for example, flash memory cards (e.g., Secure Digital (SD) cards, microSD cards, xD picture cards, and the like), and USB flash drives, optical discs, external HDDs. and the like.

The platform 1500 may also include interface circuitry (not shown) that is used to connect external devices with the platform 1500. The external devices connected to the platform 1500 via the interface circuitry include sensors 1522 and electro-mechanical components (shown as EMCs 1524), as well as removable memory devices coupled to removable memory 1526.

The sensors 1522 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1524 include devices, modules, or subsystems whose purpose is to enable platform 1500 to change its state, position, and/or orientation, or move or control a mechanism or (sub)system. Additionally, EMCs 1524 may be configured to generate and send messages/signaling to other components of the platform 1500 to indicate a current state of the EMCs 1524. Examples of the EMCs 1524 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1500 is configured to operate one or more EMCs 1524 based on one or more captured events and/or instructions or control signals received from a service provider and/or various clients. In some implementations, the interface circuitry may connect the platform 1500 with positioning circuitry 1516. The positioning circuitry 1516 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1516 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1516 may include a Micro-PNT IC that uses a master timing clock to perform position tracking/estimation without GNSS assistance. The positioning circuitry 1516 may also be part of, or interact with, the baseband circuitry 1504 and/or radio front end module 1506 to communicate with the nodes and components of the positioning network. The positioning circuitry 1516 may also provide position data and/or time data to the application circuitry 1502, which may use the data to synchronize operations with various infrastructure (e.g., radio base stations), for turn-by-turn navigation applications, or the like.

In some implementations, the interface circuitry may connect the platform 1500 with Near-Field Communication circuitry (shown as NFC circuitry 1512). The NFC circuitry 1512 is configured to provide contactless, short-range communications based on radio frequency identification (RFID) standards, wherein magnetic field induction is used to enable communication between NFC circuitry 1512 and NFC-enabled devices external to the platform 1500 (e.g., an "NFC touchpoint"). NFC circuitry 1512 comprises an NFC controller coupled with an antenna element and a processor coupled with the NFC controller. The NFC controller may be a chip/IC providing NFC functionalities to the NFC circuitry 1512 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1512, or initiate data transfer between the NFC circuitry 1512 and another active NFC device (e.g., a smartphone or an NFC-enabled POS terminal) that is proximate to the platform 1500.

The driver circuitry 1518 may include software and hardware elements that operate to control particular devices that are embedded in the platform 1500, attached to the platform 1500, or otherwise communicatively coupled with the platform 1500. The driver circuitry 1518 may include individual drivers allowing other components of the platform 1500 to interact with or control various input/output (I/O) devices that may be present within, or connected to, the platform 1500. For example, driver circuitry 1518 may include a display driver to control and allow access to a display device, a touchscreen driver to control and allow access to a touchscreen interface of the platform 1500, sensor drivers to obtain sensor readings of sensors 1522 and control and allow access to sensors 1522, EMC drivers to obtain actuator positions of the EMCs 1524 and/or control and allow access to the EMCs 1524, a camera driver to control and allow access to an embedded image capture device, audio drivers to control and allow access to one or more audio devices.

The power management integrated circuitry (shown as PMIC 1510) (also referred to as "power management circuitry") may manage power provided to various components of the platform 1500. In particular, with respect to the baseband circuitry 1504, the PMIC 1510 may control power-source selection, voltage scaling, battery charging, or DC-to-DC conversion. The PMIC 1510 may often be included when the platform 1500 is capable of being powered by a battery 1514, for example, when the device is included in a UE.

In some embodiments, the PMIC 1510 may control, or otherwise be part of, various power saving mechanisms of the platform 15011. For example, if the platform 1500 is in an RRC_Connected state, where it is still connected to the RAN node as it expects to receive traffic shortly, then it may enter a state known as Discontinuous Reception Mode (DRX) after a period of inactivity. During this state, the platform 1500 may power down for brief intervals of time and thus save power. If there is no data traffic activity for an extended period of time, then the platform 1500 may transition off to an RRC_Idle state, where it disconnects from the network and does not perform operations such as channel quality feedback, handover, etc. The platform 1500 goes into a very low power state and it performs paging where again it periodically wakes up to listen to the network and then powers down again. The platform 1500 may not receive data in this state; in order to receive data, it transitions back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1514 may power the platform 1500, although in some examples the platform 1500 may be mounted deployed in a fixed location, and may have a power supply coupled to an electrical grid. The battery 1514 may be a lithium ion battery, a metal-air battery, such as a zinc-air battery, an aluminum-air battery, a lithium-air battery, and the like. In some implementations, such as in V2X applications, the battery 1514 may be a typical lead-acid automotive battery.

In some implementations, the battery 1514 may be a "smart battery," which includes or is coupled with a Battery Management System (BMS) or battery monitoring integrated circuitry. The BMS may be included in the platform 1500 to track the state of charge (SoCh) of the battery 1514. The BMS may be used to monitor other parameters of the battery 1514 to provide failure predictions, such as the state of health (SoH) and the state of function (SoF) of the battery 1514. The BMS may communicate the information of the battery 1514 to the application circuitry 1502 or other components of the platform 1500. The BMS may also include an analog-to-digital (ADC) convertor that allows the application circuitry 1502 to directly monitor the voltage of the battery 1514 or the current flow from the battery 1514. The battery parameters may be used to determine actions that the platform 150) may perform, such as transmission frequency, network operation, sensing frequency, and the like.

A power block, or other power supply coupled to an electrical grid may be coupled with the BMS to charge the battery 1514. In some examples, the power block may be replaced with a wireless power receiver to obtain the power wirelessly, for example, through a loop antenna in the computer platform 1500. In these examples, a wireless battery charging circuit may be included in the BMS. The specific charging circuits chosen may depend on the size of the battery 1514, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1520 includes various input/output (I/O) devices present within, or connected to, the platform 1500, and includes one or more user interfaces designed to enable user interaction with the platform 1500 and/or peripheral component interfaces designed to enable peripheral component interaction with the platform 1500. The user interface circuitry 1520 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1500. The output device circuitry may also include speakers or other audio emitting devices, printer(s), and/or the like. In some embodiments, the sensors 1522 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1500 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 16:
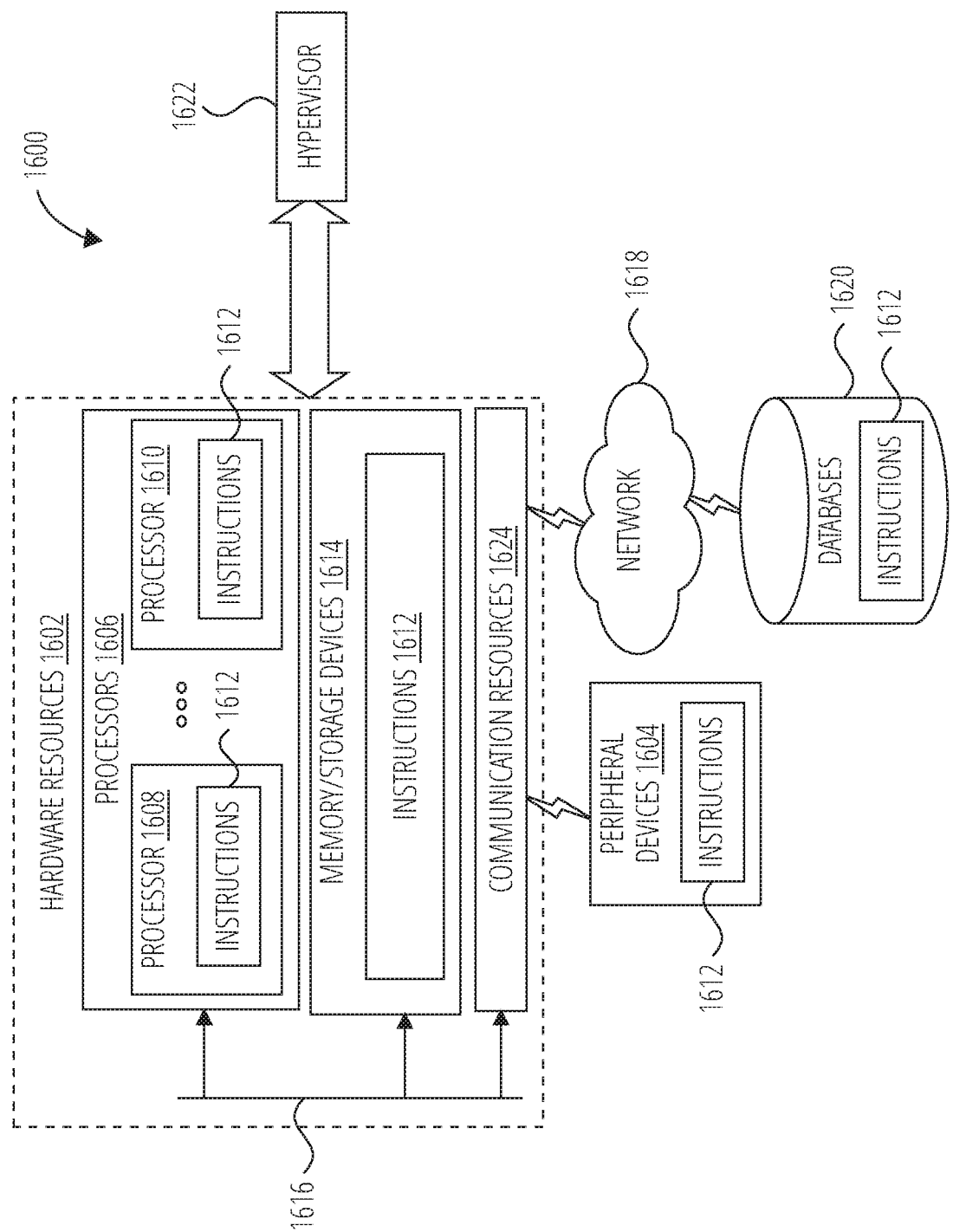
FIG. 16 illustrates components in accordance with one embodiment.

FIG. 16 is a block diagram illustrating components 1600, according to some example embodiments, able to read instructions from a machine-readable or computer-readable medium (e.g., a non-transitory machine-readable storage medium) and perform any one or more of the methodologies discussed herein. Specifically, FIG. 16 shows a diagrammatic representation of hardware resources 1602 including one or more processors 1606 (or processor cores), one or more memory/storage devices 1614, and one or more communication resources 1624, each of which may be communicatively coupled via a bus 1616. For embodiments where node virtualization (e.g., NFV) is utilized, a hypervisor 1622 may be executed to provide an execution environment for one or more network slices/sub-slices to utilize the hardware resources 1602.

The processors 1606 (e.g., a central processing unit (CPU), a reduced instruction set computing (RISC) processor, a complex instruction set computing (CISC) processor, a graphics processing unit (OPU), a digital signal processor (DSP) such as a baseband processor, an application specific integrated circuit (ASIC), a radio-frequency integrated circuit (RFIC), another processor, or any suitable combination thereof) may include, for example, a processor 1608 and a processor 1610.

The memory/storage devices 1614 may include main memory, disk storage, or any suitable combination thereof. The memory/storage devices 1614 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1624 may include interconnection or network interface components or other suitable devices to communicate with one or more peripheral devices 1604 or one or more databases 1620 via a network 1618. For example, the communication resources 1624 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1612 may comprise software, a program, an application, an applet, an app, or other executable code for causing at least any of the processors 1606 to perform any one or more of the methodologies discussed herein. The instructions 1612 may reside, completely or partially, within at least one of the processors 1606 (e.g., within the processor's cache memory), the memory/storage devices 1614, or any suitable combination thereof. Furthermore, any portion of the instructions 1612 may be transferred to the hardware resources 1602 from any combination of the peripheral devices 1604 or the databases 1620. Accordingly, the memory of the processors 1606, the memory/storage devices 1614, the peripheral devices 1604, and the databases 1620 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a U E, base station, network element, etc. as described above in connection with one or more of the preceding figures may be configured to operate in accordance with one or more of the examples set forth below in the example section.

EXAMPLE SECTION

The following examples pertain to further embodiments.

Example 1 is a method for a master evolved Node B (MeNB) to configure user plane (UP) integrity protection (IP) for a user equipment (UE) that supports Evolved Universal Terrestrial Radio Access-New Radio dual connectivity (EN-DC). The method includes: performing an attach procedure with the UE, wherein the MeNB forwards a protocol data unit (PDU) session establishment request from the UE to a mobility management entity (MME), the PDU session establishment request comprising a U E security capability indicating whether the UE supports a packet data convergence protocol (PDCP) UP IP; performing a secondary node addition procedure for operating the dual connectivity with the MeNB and a secondary g Node B (SgNB); and determining a UP path based on the UE security capability, an MeNB security capability, and an SgNB security capability.

Example 2 includes the method of Example 1, wherein support for the PDCP UP IP comprises support for relay node (RN) PDCP UP IP used in Long Term Evolution (LTE), and wherein the SgNB security capability corresponds to the SgNB supporting New Radio (NR) PDCP with UP IP.

Example 3 includes the method of Example 2, wherein the UE security capability further indicates whether the UE supports the RN PDCP UP IP used in LTE and the NR PDCP with UP IP.

Example 4 includes the method of Example 3, wherein the MeNB security capability indicates whether the MeNB supports the RN PDCP UP IP used in LTE and NR PDCP without UP IP.

Example 5 includes the method of Example 4, wherein determining the UP path comprises selecting to use UP IP on at least one of a secondary cell group (SCG) bearer and a split bearer based on: determining that the UE does not support the RN PDCP UP IP used in LTE and that the UE supports the NR PDCP with UP IP; and determining that the MeNB supports the RN PDCP UP IP used in LTE and that the MeNB supports the NR PDCP without UP IP.

Example 6 includes the method of Example 4, wherein determining the UP path comprises selecting to use UP IP on at least one of a secondary cell group (SCG) bearer and a split bearer based on: determining that the UE does not support the RN PDCP UP IP used in LTE and that the UE supports the NR PDCP with UP IP; and determining that the MeNB does not support the RN PDCP UP IP used in LTE and that the MeNB supports the NR PDCP without UP IP.

Example 7 includes the method of Example 4, wherein determining the UP path comprises selecting to use UP IP on at least one of a master cell group (MCG) bearer, a secondary cell group (SCG) bearer, and a split bearer based on: determining that the UE supports the RN PDCP UP IP used in LTE and that the UE supports the NR PDCP with UP IP; and determining that the MeNB supports the RN PDCP UP IP used in LTE and that the MeNB supports the NR PDCP without UP IP.

Example 8 includes the method of Example 4, wherein determining the UP path comprises selecting to use UP TP on at least one of a secondary cell group (SCG) bearer and a split bearer based on: determining that the UE supports the RN PDCP UP IP used in LTE and that the UE supports the NR PDCP with UP IP; and determining that the MeNB does not support the RN PDCP UP IP used in LTE and that the MeNB supports the NR PDCP without UP IP.

Example 9 includes the method of Example 1, wherein performing the attach procedure includes receiving, from the MME, an S1 initial context setup message from the MME to configure a UP security policy to the MeNB.

Example 10 includes the method of Example 1, wherein performing the secondary node addition procedure includes providing an indicate from the MeNB to the SgNB that UP IP can be activated.

Example 11 is a method for a user equipment (LIE). The method includes; performing a radio resource control (RRC) connection set up procedure with a master evolved Node B (MeNB); sending, through the MeNB to a mobility management entity (MME), a protocol data unit (PDU) session establishment request comprising a UE security capability to indicate to the MME whether the UE supports packet data convergence protocol (PDCP) user plane (UP) integrity protection (IP); and receiving, from the MeNB, an RRC connection reconfiguration message establishing UP IP for Evolved Universal Terrestrial Radio Access-New Radio dual connectivity (EN-DC) operation with the MeNB and a secondary g Node B (SgNB).

Example 12 includes the method of Example 11, wherein the UE security capability indicates that the UE supports relay node PDCP UP IP used in Long Term Evolution (LTE) and that the UE supports new radio (NR) PDCP with UP IP.

Example 13 includes the method of Example 12, wherein the RRC connection reconfiguration message establishes that UP IP is to be used for at least one of a master cell group (MCG) bearer, a secondary cell group (SCG) bearer, and a split bearer.

Example 14 includes the method of Example 11, wherein the UE security capability indicates that the UE does not support relay node PDCP UP IP used in Long Term Evolution (LTE) and that the UE supports new radio (NR) PDCP with UP IP.

Example 15 includes the method of Example 14, wherein the RRC connection reconfiguration message establishes that UP IP is to be used for at least one of a secondary cell group (SCG) bearer and a split bearer.

Example 16 is a method for a mobility management entity (MME). The method includes: receiving, through a master evolved Node B (MeNB) from a user equipment (UE), a protocol data unit (PDU) session establishment request comprising a UE security capability to indicate whether the UE supports packet data convergence protocol (PDCP) user plane (UP) integrity protection (IP); determining whether the MeNB supports the PDCP UP IP; and based on whether both the UE and the MeNB support the PDCP UP IP, determine whether to activate the UP IP in the MeNB for Evolved Universal Terrestrial Radio Access-New Radio dual connectivity (EN-DC).

Example 17 includes the method of Example 16, wherein the PDCP UP IP comprises relay node (RN) PDCP UP IP used in Long Term Evolution (LTE).

Example 18 includes the method of Example 16, further comprising generating an S1 initial context setup message to configure an UP security policy to the MeNB.

Example 19 may include an apparatus comprising means to perform one or more elements of a method described in or related to any of the above Examples, or any other method or process described herein.

Example 20 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 21 may include an apparatus comprising logic, modules, or circuitry to perform one or more elements of a method described in or related to any of the above Examples, or any other method or process described herein.

Example 22 may include a method, technique, or process as described in or related to any of the above Examples, or portions or parts thereof.

Example 23 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 24 may include a signal as described in or related to any of the above Examples, or portions or parts thereof.

Example 25 may include a datagram, packet, frame, segment, protocol data unit (PDU), or message as described in or related to any of the above Examples, or portions or parts thereof, or otherwise described in the present disclosure.

Example 26 may include a signal encoded with data as described in or related to any of the above Examples, or portions or parts thereof, or otherwise described in the present disclosure.

Example 27 may include a signal encoded with a datagram, packet, frame, segment, PDU, or message as described in or related to any of the above Examples, or portions or parts thereof, or otherwise described in the present disclosure.

Example 28 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 29 may include a computer program comprising instructions, wherein execution of the program by a processing element is to cause the processing element to carry out the method, techniques, or process as described in or related to any of the above Examples, or portions thereof.

Example 30 may include a signal in a wireless network as shown and described herein.

Example 31 may include a method of communicating in a wireless network as shown and described herein.

Example 32 may include a system for providing wireless communication as shown and described herein.

Example 33 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc, of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc, of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a base station configured as a master evolved Node B (MeNB) to configure user plane (UP) integrity protection (IP) for a user equipment (UE) that supports Evolved Universal Terrestrial Radio Access-New Radio dual connectivity (EN-DC), the method comprising:
   performing an attach procedure with the UE, wherein the MeNB forwards a protocol data unit (PDU) session establishment request from the UE to a mobility management entity (MME), the PDU session establishment request comprising a UE security capability indicating whether the UE supports a packet data convergence protocol (PDCP) UP IP;
   performing a secondary node addition procedure for operating the dual connectivity with the MeNB and a secondary g Node B (SgNB); and
   determining a UP path based on the UE security capability, an MeNB security capability, and an SgNB security capability, wherein determining the UP path comprises selecting to use UP IP on at least one of a secondary cell group (SCG) bearer and a split bearer based on:
      determining that the UE does not support relay node (RN) PDCP UP IP used in Long Term Evolution (LTE) and that the UE supports New Radio (NR) PDCP with UP IP; and
      determining that the MeNB supports the RN PDCP UP IP used in LTE and that the MeNB supports the NR PDCP without UP IP.

2. The method of claim 1, wherein support for the PDCP UP IP comprises support for the RN PDCP UP IP used in LTE, and wherein the SgNB security capability corresponds to the SgNB supporting the NR PDCP with UP IP.

3. The method of claim 2, wherein the UE security capability further indicates whether the UE supports the RN PDCP UP IP used in LTE and the NR PDCP with UP IP.

4. The method of claim 3, wherein the MeNB security capability indicates whether the MeNB supports the RN PDCP UP IP used in LTE and NR PDCP without UP IP.

5. The method of claim 1, wherein performing the attach procedure includes receiving, from the MME, an S1 initial context setup message from the MME to configure a UP security policy to the MeNB.

6. The method of claim 1, wherein performing the secondary node addition procedure includes providing an indication from the MeNB to the SgNB that UP IP can be activated.

7. A method for a base station configured as a master evolved Node B (MeNB) to configure user plane (UP) integrity protection (IP) for a user equipment (UE) that supports Evolved Universal Terrestrial Radio Access-New Radio dual connectivity (EN-DC), the method comprising:
   performing an attach procedure with the UE, wherein the MeNB forwards a protocol data unit (PDU) session establishment request from the UE to a mobility management entity (MME), the PDU session establishment request comprising a UE security capability indicating whether the UE supports a packet data convergence protocol (PDCP) UP IP;
   performing a secondary node addition procedure for operating the dual connectivity with the MeNB and a secondary g Node B (SgNB); and
   determining a UP path based on the UE security capability, an MeNB security capability, and an SgNB security capability, wherein determining the UP path comprises selecting to use UP IP on at least one of a secondary cell group (SCG) bearer and a split bearer based on:
      determining that the UE does not support relay node (RN) PDCP UP IP used in Long Term Evolution (LTE) and that the UE supports New Radio (NR) PDCP with UP IP; and
      determining that the MeNB does not support the RN PDCP UP IP used in LTE and that the MeNB supports the NR PDCP without UP IP.

8. The method of claim 7, wherein support for the PDCP UP IP comprises support for the RN PDCP UP IP used in LTE, and wherein the SgNB security capability corresponds to the SgNB supporting the NR PDCP with UP IP.

9. The method of claim 8, wherein the UE security capability further indicates whether the UE supports the RN PDCP UP IP used in LTE and the NR PDCP with UP IP.

10. The method of claim 9, wherein the MeNB security capability indicates whether the MeNB supports the RN PDCP UP IP used in LTE and NR PDCP without UP IP.

11. The method of claim 7, wherein performing the attach procedure includes receiving, from the MME, an S1 initial context setup message from the MME to configure a UP security policy to the MeNB.

12. The method of claim 7, wherein performing the secondary node addition procedure includes providing an indication from the MeNB to the SgNB that UP IP can be activated.

13. A method for a base station configured as a master evolved Node B (MeNB) to configure user plane (UP) integrity protection (IP) for a user equipment (UE) that supports Evolved Universal Terrestrial Radio Access-New Radio dual connectivity (EN-DC), the method comprising:
   performing an attach procedure with the UE, wherein the MeNB forwards a protocol data unit (PDU) session establishment request from the UE to a mobility management entity (MME), the PDU session establishment request comprising a UE security capability indicating whether the UE supports a packet data convergence protocol (PDCP) UP IP;
   performing a secondary node addition procedure for operating the dual connectivity with the MeNB and a secondary g Node B (SgNB); and
   determining a UP path based on the UE security capability, an MeNB security capability, and an SgNB security capability, wherein determining the UP path comprises selecting to use UP IP on at least one of a secondary cell group (SCG) bearer and a split bearer based on:
  determining that the UE supports relay node (RN) PDCP UP IP used in Long Term Evolution (LTE) and that the UE supports New Radio (NR) PDCP with UP IP; and
  determining that the MeNB supports the RN PDCP UP IP used in LTE and that the MeNB supports the NR PDCP without UP IP.

14. The method of claim 13, wherein support for the PDCP UP IP comprises support for the RN PDCP UP IP used in LTE, and wherein the SgNB security capability corresponds to the SgNB supporting the NR PDCP with UP IP.

15. The method of claim 14, wherein the UE security capability further indicates whether the UE supports the RN PDCP UP IP used in LTE and the NR PDCP with UP IP.

16. The method of claim 15, wherein the MeNB security capability indicates whether the MeNB supports the RN PDCP UP IP used in LTE and NR PDCP without UP IP.

17. The method of claim 13, wherein performing the attach procedure includes receiving, from the MME, an S1 initial context setup message from the MME to configure a UP security policy to the MeNB.

18. The method of claim 13, wherein performing the secondary node addition procedure includes providing an indication from the MeNB to the SgNB that UP IP can be activated.

* * * * *